United States Patent
Tanioka et al.

(10) Patent No.: US 6,419,155 B1
(45) Date of Patent: Jul. 16, 2002

(54) LASER BEAM SCAN TYPE BARCODE READER AND PROGRAM RECORDING MEDIUMS

(75) Inventors: Keiichi Tanioka, Ome; Akihiro Nemoto, Hachioji, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/419,476

(22) Filed: Oct. 15, 1999

(30) Foreign Application Priority Data

Oct. 29, 1998  (JP) .......................................... 10-322947

(51) Int. Cl.[7] ................................................. G06K 7/10
(52) U.S. Cl. .............................. 235/462.33; 235/462.2; 235/462.32
(58) Field of Search ....................... 235/462.33, 462.16, 235/462.2, 462.32, 462.36, 462.37; 355/74, 75

(56) References Cited

U.S. PATENT DOCUMENTS

| | | | | |
|---|---|---|---|---|
| 4,079,240 A | * | 3/1978 | Rynkowski | 235/462.28 |
| 4,436,402 A | * | 3/1984 | Seimiya et al. | 355/75 |
| 4,728,783 A | * | 3/1988 | Brass et al. | 235/456 |
| 5,128,527 A | * | 7/1992 | Kawai et al. | 235/462.07 |
| 5,734,153 A | * | 3/1998 | Swartz | 235/462.21 |
| 5,777,310 A | * | 7/1998 | Liu et al. | 235/462.12 |
| 5,790,715 A | * | 8/1998 | Iizuka | 382/309 |
| 5,837,987 A | * | 11/1998 | Koenck et al. | 235/462.27 |

FOREIGN PATENT DOCUMENTS

JP            06-131489       *  5/1994

* cited by examiner

Primary Examiner—Michael G. Lee
Assistant Examiner—Diane I. Lee
(74) Attorney, Agent, or Firm—Frishauf, Holtz, Goodman & Chick, P.C.

(57) ABSTRACT

A laser beam scan type barcode reader which reads a pair of spaced marks which adjusts or specify corrects start and stop positions of the laser beam irradiation. The distance between the pair of marks corresponds to a length of a barcode to be read. The reader detects the start and stop positions of the laser beam irradiation determined by the pair of marks, and sets the detected start and stop positions of the laser beam irradiation. When the reader reads the barcode, it controls the turning on/off of the laser beam in one scan period based on the set start and stop positions of the laser beam irradiation, and determines the actual scan span in which the laser beam is turned on in the one scan period based on the start and stop positions determined by the pair of marks, which ensures preventing structural, functional and characteristic deviations of the reader from the standards from influencing the scan span of the laser beam.

9 Claims, 32 Drawing Sheets

FIG.16

| CAPTURE VALUE |
|---|
| PRECEDING CAPTURE VALUE |
| MAXIMUM LENGTH RIGHT - SCAN START DATA |
| MAXIMUM LENGTH RIGHT - SCAN STOP DATA |
| MAXIMUM LENGTH LEFT - SCAN START DATA |
| MAXIMUM LENGTH LEFT - SCAN STOP DATA |
| MEDIUM LENGTH RIGHT - SCAN START DATA |
| MEDIUM LENGTH RIGHT - SCAN STOP DATA |
| MEDIUM LENGTH LEFT - SCAN START DATA |
| MEDIUM LENGTH LEFT - SCAN STOP DATA |
| MINIMUM LENGTH RIGHT - SCAN START DATA |
| MINIMUM LENGTH RIGHT - SCAN STOP DATA |
| MINIMUM LENGTH LEFT - SCAN START DATA |
| MINIMUM LENGTH LEFT - SCAN STOP DATA |

} WORK MEMORY

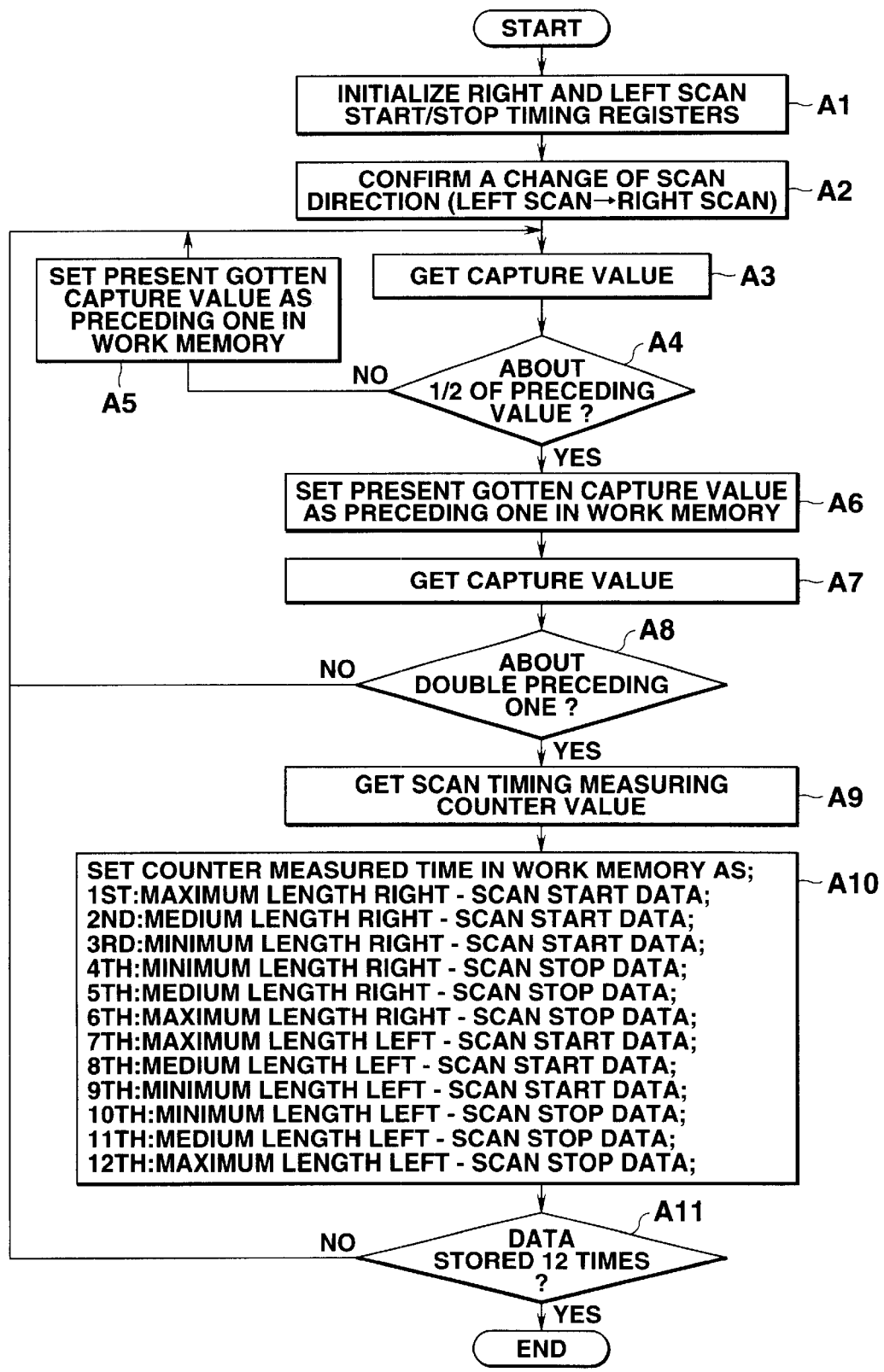

BEFORE CORRECTION

READ A PAIR OF MARKS

AFTER CORRECTION

MAXIMUM
LENGTH MODE

MEDIUM
LENGTH MODE

MINIMUM
LENGTH MODE

FIG. 27A SET SCAN SPAN 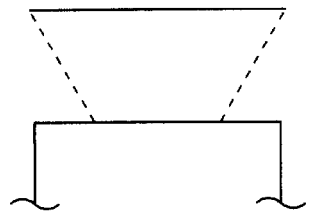
FIG. 27B UP 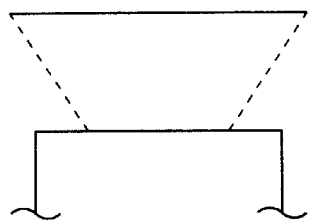
FIG. 27C DOWN 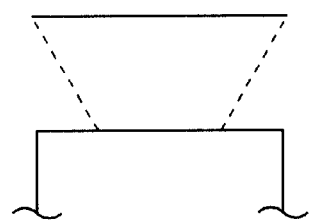
FIG. 27D DOWN 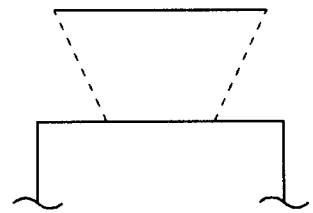
FIG. 27E DOWN 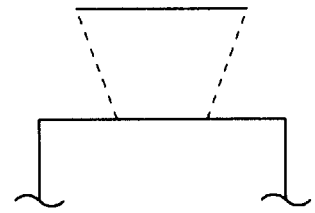

SCAN OF VIBRATION MIRROR LASER SCANNER

LASER BEAM SCAN TYPE BARCODE READER AND PROGRAM RECORDING MEDIUMS

BACKGROUND OF THE INVENTION

The present invention relates to laser beam scan type barcode readers which drive a scanning mirror to irradiate a barcode with a laser beam, receives a laser beam reflected by the barcode and reads the barcode.

As shown in FIG. 29, a conventional laser beam scan type barcode reader includes a laser beam scan type barcode scanner unit 1 and an analysis system 2 which receives a barcode image transferred from the scanner unit 1, analyzes it and stores resulting barcode data. As shown, the analysis system 2 includes a scanner unit power supply controller 2-1, a laser beam on/off controller 2-2, a timing signal both-edge determiner 2-3, an image signal both-edge determiner 2-4, an interrupt controller 2-5, a counter 2-6, a DMA controller 2-7, a work memory 2-8, a program memory 2-9, and a CPU 2-10.

Referring to FIGS. 29–32, a whole structure of the scanner unit 1 and the analysis system 2 and their operations will be described briefly. FIG. 30 is a whole schematic of the scanner unit 1. When a power supply is turned on in the system 2, a power supply on/off signal is applied from the scanner unit power supply controller 2-1 to a power supply 1-1 of the scanner unit 1 such that drive voltages are applied to a laser beam irradiation controller 1-2, a scanning mirror controller 1-3, a scan timing detector 1-4, a received beam analyzer 1-5, and a laser beam receiver 1-6 of the scanner unit to operate them. When a laser beam irradiation on/off signal is applied from the laser beam on/off controller 2-2 of the analysis system 2 to the laser beam irradiation controller 1-2, the laser beam irradiation controller 1-2 drives the laser beam irradiator 1-7 to cause same to start laser beam irradiation. At that time, the laser beam scanning mirror (vibration mirror or polygon mirror) 8 is driven by the scanning mirror controller 1-3 to reflect a laser beam from the laser beam irradiator 1-7 to scan a target barcode.

When the laser beam scanning starts in this way, the laser beam receiver 1-6 receives a reflected beam and transduces it to an electric signal. The received beam analyzer 1-5 converts a monochromatic image of the barcode to binary digital data depending on the scanning velocity, and transfers it as a barcode image signal to the image signal both-edge determiner 2-4. At this time, the scan timing detector 1-4 detects a particular position of the scanning mirror and delivers a pulse or an inverted pulse digital signal as a scan timing signal to the timing signal both-edge determiner 2-3.

FIG. 31 is a basic timing chart in which a high laser beam signal is output during a period between power supply on and off. The scanner unit 1 outputs a scan timing signal inverted each time one scan is completed, delivers the signal to the timing signal both-edge determiner 2-3, and a barcode image signal output for each scan to the image signal both-edge determiner 2-4. The timing signal both-edge determiner 2-3 detects a rise and a fall in the scan timing signal, and delivers one-scan complete information as an interrupt request to the interrupt controller 2-5, which ignores a stability wait state or an interrupt request occurring during an unfixed scan period of FIG. 31. When CPU 2-10 receives an interrupt request immediately after the scan operation is stabilized, it performs a decoding process which includes decoding barcode information transferred to the work memory 2-8 in accordance with a program stored in the program memory 2-9. The reading and transfer of the barcode to the work memory 2-8 is performed as follows. Each time a barcode image signal changes, immediately after the scan operation is stabilized, the image signal both-edge determiner 2-4 detects a change in the barcode image signal, delivers barcode image change information to the DMA controller 2-7, which gets data in the counter 2-6 and transfers it to the work memory 2-8. The counter 2-6 invariably performs a counting operation during the operation of the scanner unit 1. When the counter 2-6 receives from the DMA controller 2-7 a signal indicative of the completion of the DMA transfer, the counter 2-6 is cleared, and the counter performs a counting operation until a change in a next barcode image signal is detected.

Since the laser beam irradiation on/of signal is on between the power supply being on and off in the laser beam scan type barcode reader, the laser beam irradiation is performed invariably during the time, and the scan range of the laser beam scan mirror 1-8 becomes a laser beam irradiation range. Conventional techniques for control of the laser beam irradiation range (scan span) are as follows: when the laser beam scan mirror 1-8 is of a mirror vibration type, (1) a system for controlling a mirror amplitude, (2) a system for controlling an emission port diameter of the scanner unit, (3) a system for controlling a curvature of the mirror obtained when the mirror is curved, and (4) a system for controlling the laser beam irradiation range by a refractive index of a medium which refracts the laser beam. When the laser beam scan mirror 1-8 is a polygon mirror, there is a system for changing the number of polygon mirrors in addition to the above mentioned systems (2)–(4).

The mirror amplitude controlling system (1) is possible in principle. However, in order to reduce the scan span, safety is required to be considered because the laser beam irradiation is performed even in a scan stop state where the vibration direction changes. More specifically, as shown in FIG. 14, right and left scans are performed alternately and repeatedly by the vibration mirror. When the scan direction changes, the mirror velocity temporarily becomes zero in both the right and left scans. Thus, the laser beam is shielded by the system housing so as not to leak out to the outside when the scan direction changes, in consideration of safety. In this case, as shown in FIG. 32, the effective irradiated beam quantity in the readable scanning range is about 70% of the whole irradiation beam quantity, and a laser beam quantity of about 30% is shielded, which leads to useless power consumption.

The irradiation port diameter controlling system (2) requires a physical or optical shutter device. Since the curvature controlling system (3) requires a function of deforming the flexible mirror physically in a state where the mirror is moving, its mechanism and circuit become large-scaled and there are difficulties in its installation space and power consumption. The laser beam refractive index controlling system (4) changes the refractive index, for example, of a liquid crystal device, and requires the liquid crystal device. Since the polygon mirror number changing system (5) is required to prepare for many polygon mirrors such as triangular, pentagonal, . . . mirrors and a switchingly selecting device for them, it has drawbacks similar to those in the systems (2) and (3). As described above, in any of the systems (1)–(5), some device is required to be added or the devices which basically compose the scanner unit are required to be changed greatly, which is a big hindrance to reducing the size and power consumption of the whole system.

It is therefore an object of the present invention to provide a laser beam scan type barcode reader which reads at least a pair of marks which correct the start and stop positions of laser beam irradiation, and corrects an actual scan span in which the laser beam is turned on in one scan period, based on the start and stop positions of the laser beam irradiation determined by the at least one pair of marks to thereby securely prevent structural, functional, and characteristic deviations of the scanner unit from the standards from influencing the scan span of the laser beam.

SUMMARY OF THE INVENTION

According to the present invention, there is provided a laser beam scan type barcode reader which drives a scan mirror to irradiate a laser beam against a barcode, receives a reflected beam from the barcode, and reads the barcode, comprising:

barcode reading means for driving a scan mirror to irradiate a laser beam on a selected one of a barcode and a pair of spaced marks, for receiving a reflected beam from the selected one of the barcode and the pair of marks, and for reading the selected one of the barcode and pair of marks;

detecting means, responsive to the barcode reading means reading the pair of marks, for detecting the start and stop positions of the laser beam irradiation determined by the pair of marks;

setting means for setting therein as scan span control information the start and stop positions detected by the detecting means; and laser beam irradiation driving means for controlling the turning on/off of the laser beam in one scan period based on the start and stop positions set as the scan span control information in reading the barcode to thereby control the actual scan span in which the laser beam is on in the one scan period based on the start and stop positions of the laser beam irradiation determined by the pair of marks.

BRIEF DESCRIPTION OF THE DRAWINGS

FIG. 16 illustrates data stored in a RAM;

FIG. 18 illustrates a process for specifying scan positions by reading the three pairs of marks MK with a scanner unit;

FIGS. 27A–E illustrate how set scan spans are finely adjusted by depressing by up and down keys;

DETAILED DESCRIPTION OF THE INVENTION

First Embodiment

Figure 1:
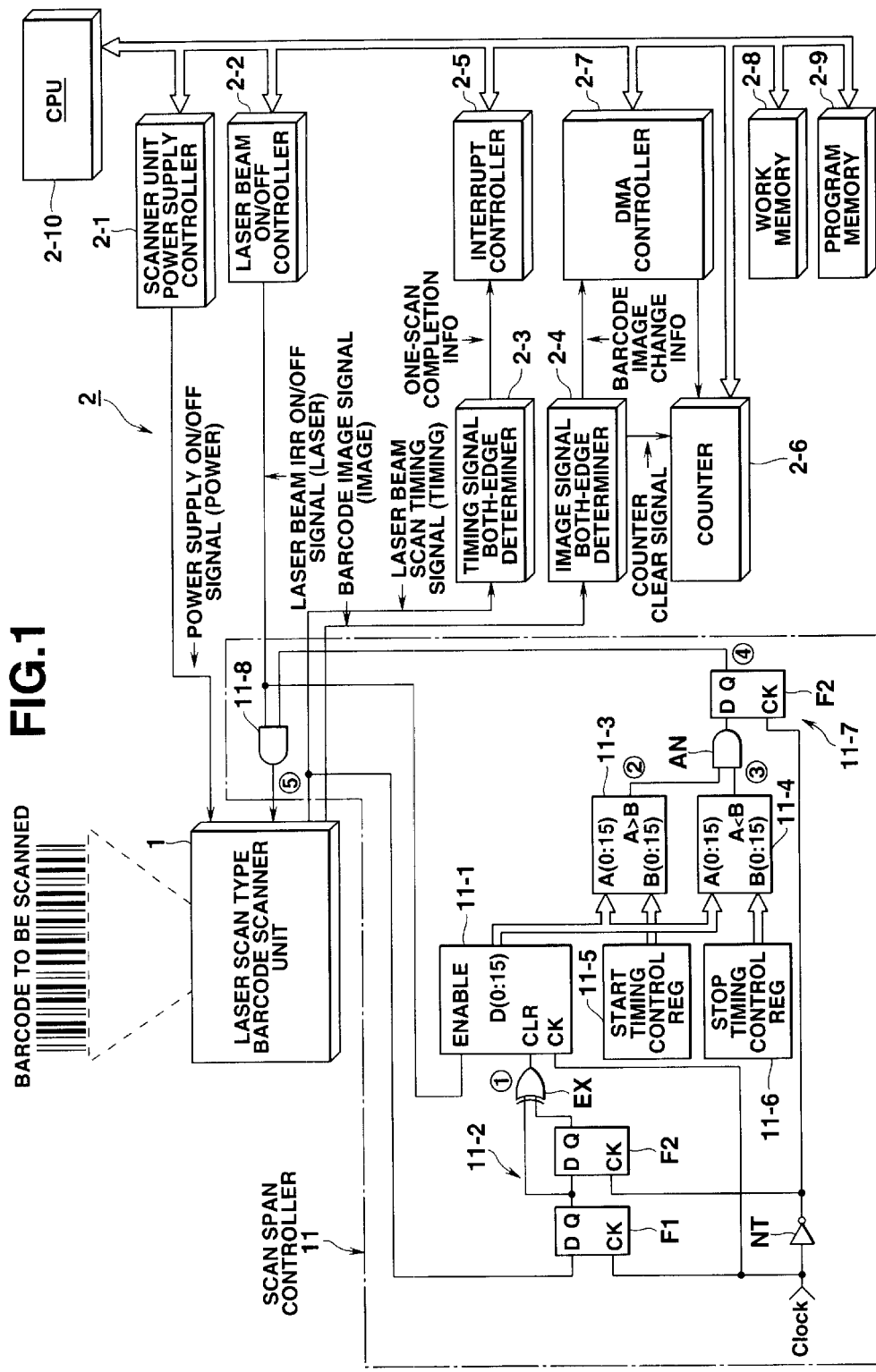
FIG. 1 is a block diagram of a first embodiment of a laser beam scan barcode reader according to the present invention.
Figure 2:
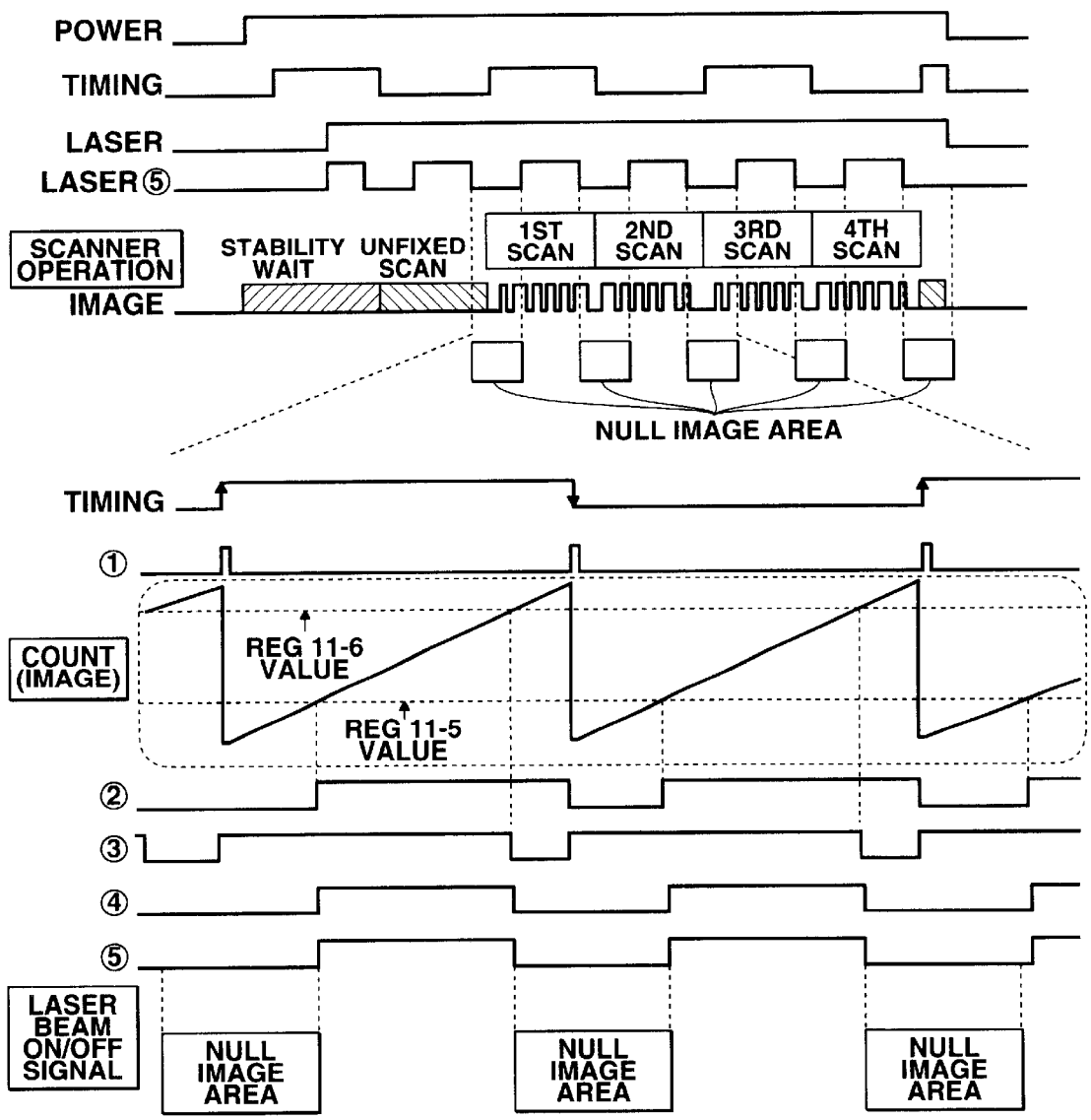
FIG. 2 is a timing chart of operation of the first embodiment.
Figure 29:
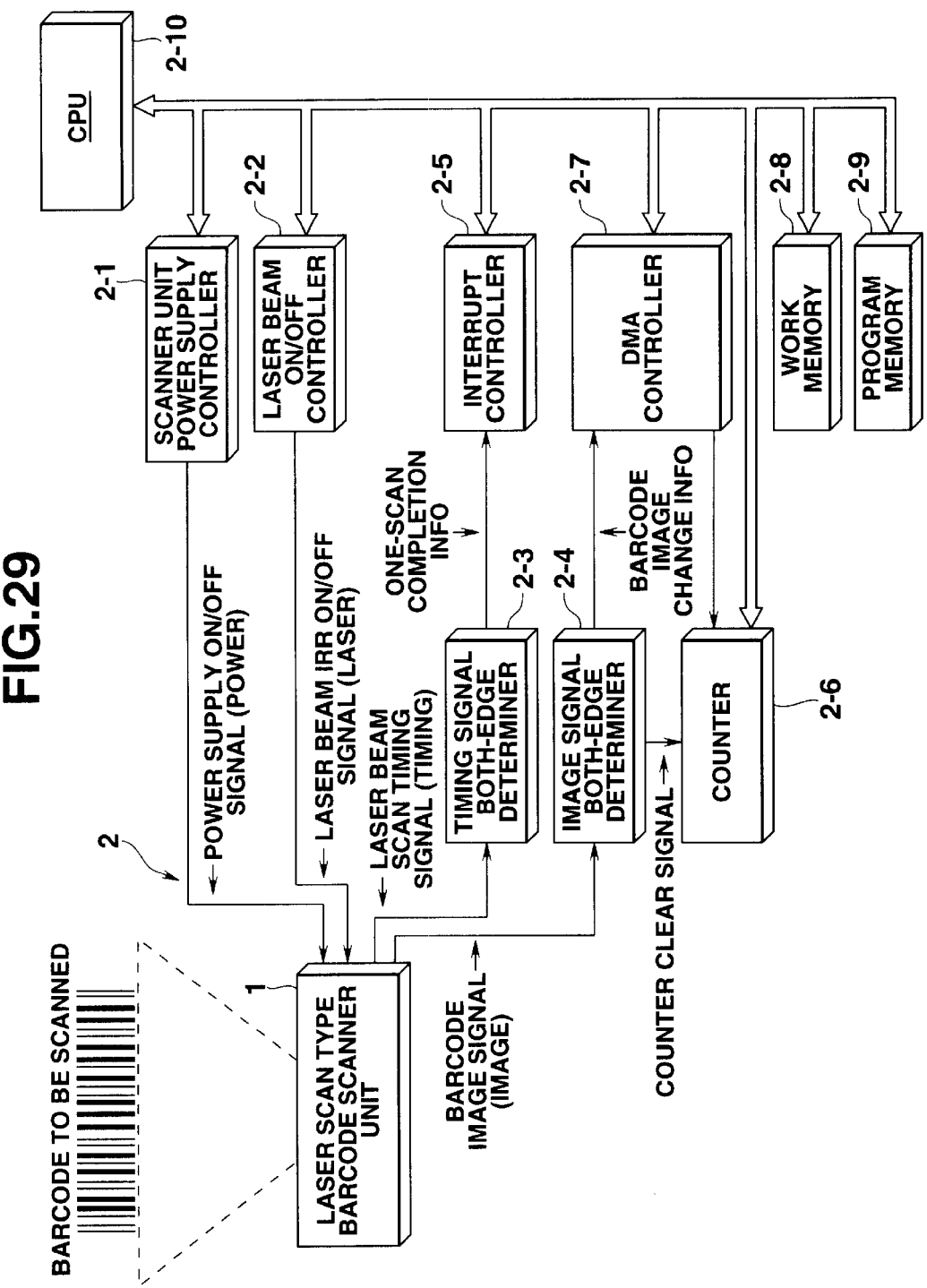
FIG. 29 is a block diagram of a conventional analysis system 2.
Figure 30:
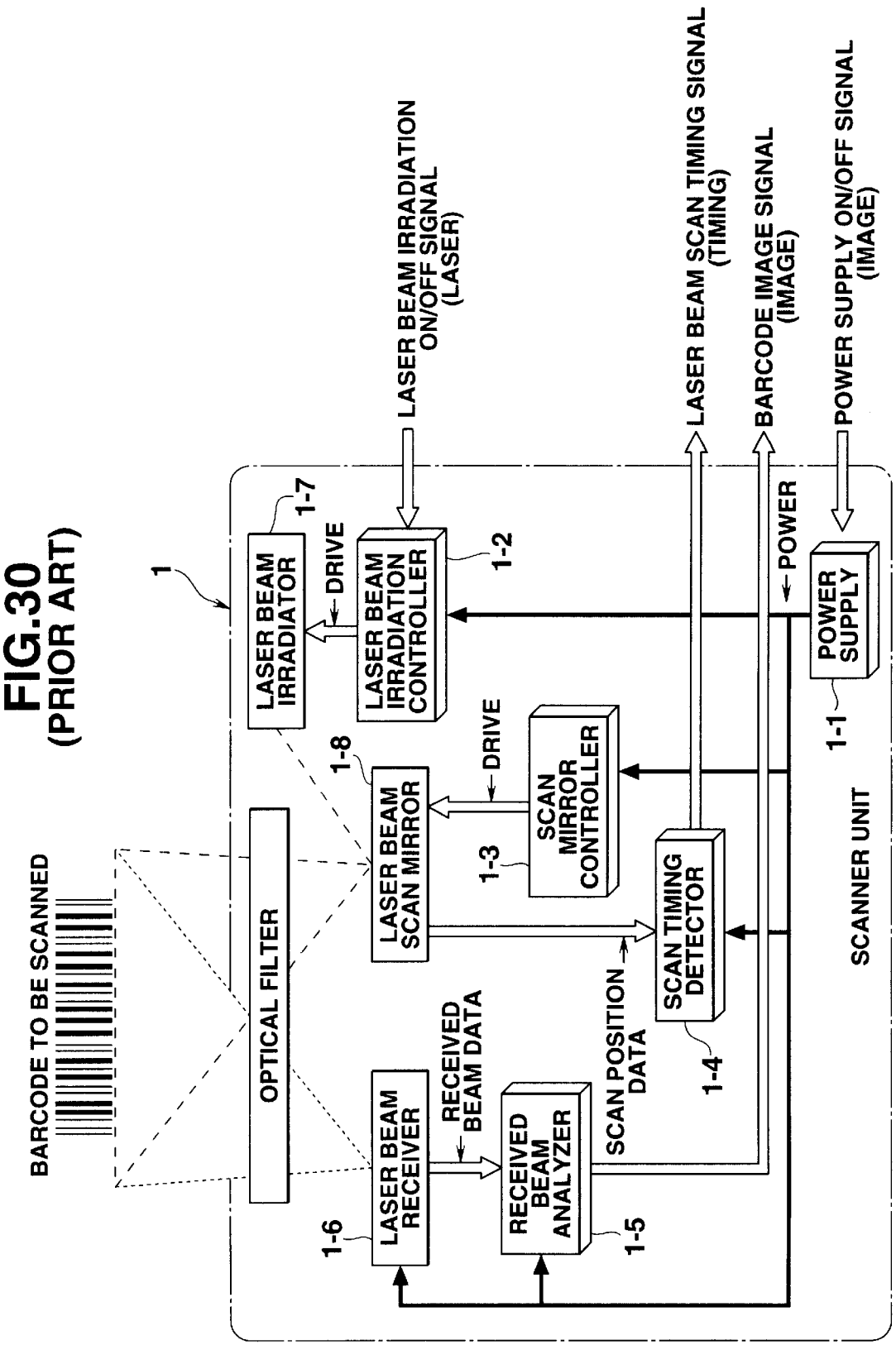
FIG. 30 is a block diagram of a conventional scanner unit 1.
Figure 31:
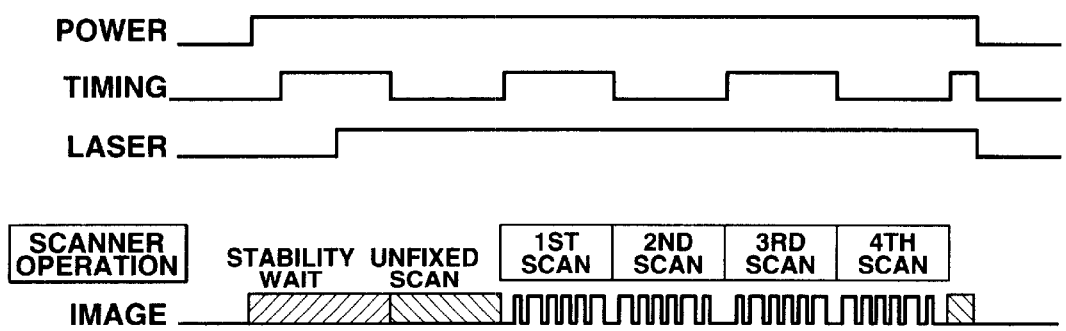
FIG. 31 is a timing chart of the conventional system operation.
Figure 32:
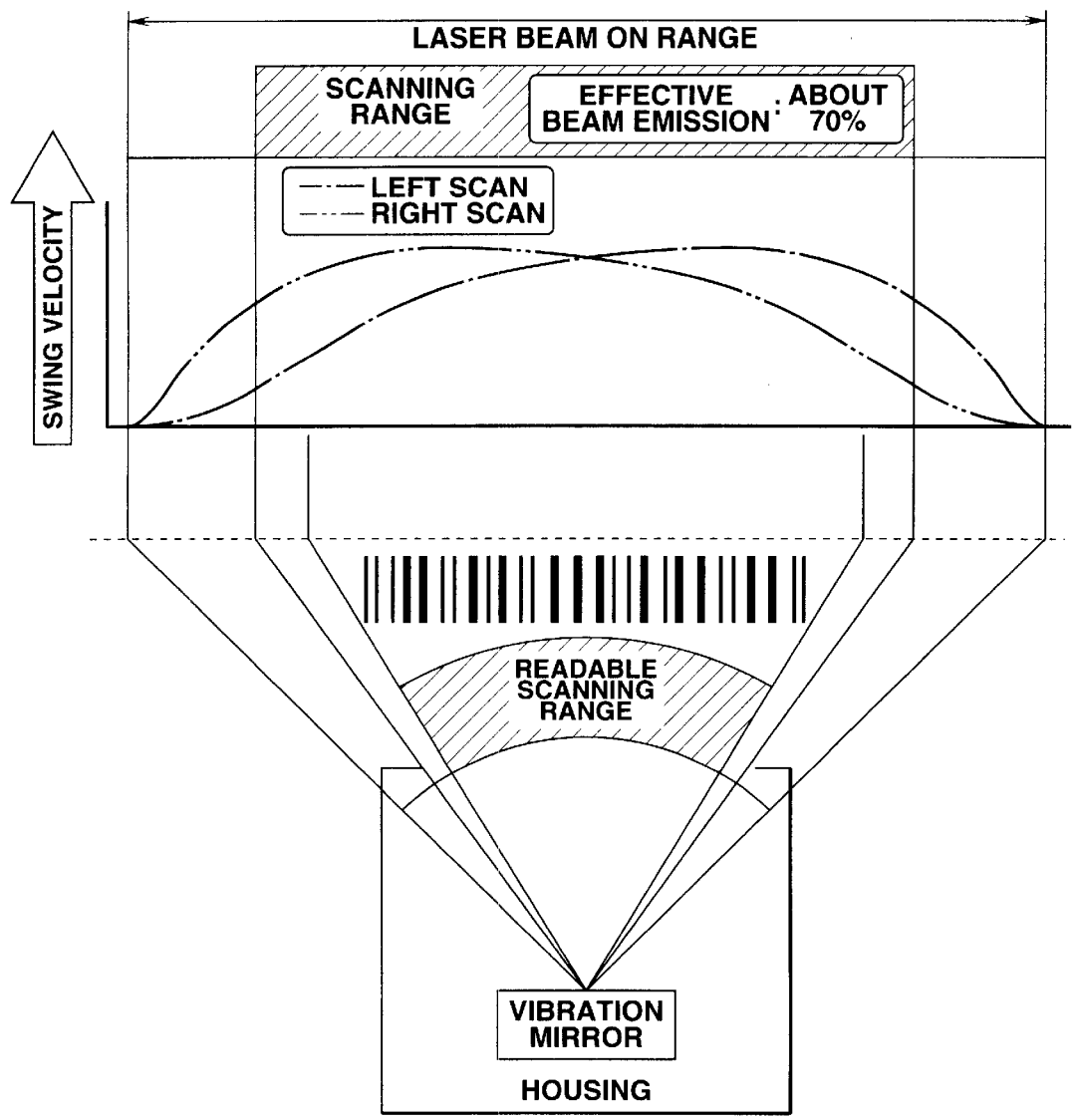
FIG. 32 illustrates the relationship between a conventional laser beam on range and a scanning range and the relationship between each of the right and left scans in the vibration mirror type scanner unit and its swinging velocity.

Referring to FIGS. 1 and 2, a first embodiment of the present invention will be described next. FIG. 1 shows a whole composition of a laser beam scan type barcode scanner unit 1 and an analysis system 2 as the first embodiment of the present invention. In FIGS. 1, 29 and 30, similar elements having basically the same function are identified by the same reference numeral and further description thereof will be omitted. In FIG. 1, a block shown by a dot—dashed line denotes a unique scan span controller 11 added to the basic system of FIG. 29. The scan span controller 11 controls a scan span of the scanner unit for laser beam irradiation during one scan period based on a laser beam scan timing signal from the scanner unit 1 and a laser beam irradiation on/off signal from the analysis system 2. The scan span controller 11 has a scan timing measuring counter 11-1 which measures a present scan timing following movement of the scan mirror during the one-scan period.

The scan timing measuring counter 11-1 is of a 16-bit type. When the laser beam irradiation on/off signal which becomes high between the turning on and off of the power supply is input to an enable terminal of the counter 11-1, the counter performs a counting operation synchronously with an input clock signal and its count represents a time (required for the scan mirror to perform one complete scan) measured from a change point of the scan timing signal to its next change point. A clear signal generator 11-2 outputs a pulse signal ① each time a change point appears in the scan timing signal to clear the counter 11-1. Thus, a measured value in the counter 11-1 represents a time required for the scan mirror to perform one complete scan operation. The clear signal generator 11-2 is comprised of two-staged D flip-flops F1 and F2 and an exclusive OR gate EX which receives the respective Q outputs from the flip-flops F1 and F2. The scan timing signal from the scanner unit 1 is delivered to a D input of the first stage flip-flop F1 and its Q output is input to a D input terminal of the second stage flip-flop F2. A clock signal is directly applied to the first flip-flop F1 and through an inverter NT to the second flip-flop F2. The value measured by the counter 11-1 is delivered to a start determining comparator 11-3 and a stop determining comparator 11-4.

The start determining comparator 11-3 is of a 16-bit type and compares a measured value A from the counter 11-1 with a preset value B in the start timing control register 11-5. As a result, when the measured value A is larger than the preset value B, the comparator 11-3 outputs a high start timing signal ②. The register 11-5 stores an optional value preset to start laser beam irradiation a predetermined time after a change point of the scan timing signal. The stop determining comparator 11-4 compares the measured value A from the counter 11-1 with the value B preset in the stop timing control register 11-6. As a result, when the measured value A is smaller than the preset value B, the comparator 11-4 outputs a high stop timing signal ③. The stop timing control register 11-6 prestores an optional value preset to stop laser beam irradiation before the scan timing signal changes during one scan period of the scan mirror. The start timing signal ② from the start determining comparator 11-3 and the stop timing signal ③ from the stop determining comparator 11-4 are delivered to a mask signal generator 11-7 which generates a signal to mask the laser beam signal. The mask signal generator 11-7 is comprised of an AND gate AN which performs a logical AND operation on the start timing signal ② and the stop timing signal ③, and a D flip-flop FF which receives at its D input terminal an output from the AND gate AN indicative of an irradiation range. The flip-flop FF receives a clock signal via an inverter NT at its clock terminal, and gives its Q output as a laser beam mask signal ④ to the AND gate 11-8. The AND gate 11-8 receives a laser beam irradiation on/off signal from the laser beam on/off controller 2-2. The output from the AND gate 11-8 is delivered as an actual laser beam irradiation on/off signal ⑤ to the scanner unit 1.

Referring to FIG. 2, operation of the scan span controller 11 will be described next. When the power supply is turned on, a power supply on/off signal is output and a laser beam irradiation on/off signal is output which is high during the time when the power on/off signal is on. Since the power supply is turned on, the scan mirror is driven. When the scan mirror is of the vibration type, the scan timing signal is inverted each time the scan direction of the mirror is reversed between right and left. When the scan mirror is a polygon mirror, the scan timing signal is inverted each time a face of the scan mirror changes to another. Then, the clear signal generator 11-2 outputs a pulse signal ① based on a change point of the scan timing signal to clear the scan timing measuring counter 11-1, which starts its counting operation when the laser beam irradiation on/off signal becomes high immediately after the power supply is turned on. Since the measured count value of the count 11-1 is cleared by the pulse signal ① from the clear signal generator 11-2, the measured value represents a measured time corresponding to one complete scan operation of the scan mirror between a change point of the scan timing signal and its next change point. The start and stop determining comparators 11-3 and 11-4 determine the start and stop timings, respectively, of the laser beam irradiation based on the measured time in the scan timing measuring counter 11-1. In this case, as shown in FIG. 2, the counter value (image) changes in the form of the sawteeth following the motion of the scan mirror. When the counter value reaches a value set in the start timing control register 11-5, the start determining comparator 11-3 outputs a start timing signal ②, which becomes high when the counter value A exceeds the register set value B and then maintains its high level until the scanning timing measuring counter 11-1 is cleared. The stop determining comparator 11-4 compares the counter value A and the preset value B in the stop timing control register 11-6. When the counter value A is smaller than the preset value B, the stop determining comparator 11-4 outputs a high stop timing signal ③ and, only when the counter value A is greater than the preset value B, outputs a low stop timing signal. Thus, as shown in FIG. 2, since the preset value in the stop timing control register 11-6 is greater than the set value in the start timing control register 11-5, the stop timing signal ③ is high when the counter value reaches the set value in the start timing control register 11-5. As a result, in response to a rise in the start timing signal ②, the mask signal generator 11-7 outputs a high mask signal ④ and delivers it to the AND gate 11-8. Thus, the AND gate 11-8 delivers a high laser beam irradiation on/off signal ⑤ to the scanner unit 1 to thereby produce a laser beam.

Thereafter, when the value of the scan timing measuring counter 11-1 increases and reaches the set value in the stop timing control register 11-6, the stop determining comparator 11-4 detects that the counter value A in the counter 11-1 is smaller than the set value B, and the stop timing signal ③ becomes high. In response to this operation, a mask signal ④ output from the mask signal generator 11-7, the laser beam irradiation on/off signal ⑤ from the AND gate 11-8 become low, and the laser beam is turned off. Thus, since the laser beam is turned on only for a predetermined time in which the laser beam irradiation on/off signal ⑤ output from the AND gate 11-8 becomes high during the one-scan period of the scan mirror 1, the actual scan span of the laser beam irradiation corresponds to one scan period of the scan mirror excluding its opposite end portions. The scan span in this case corresponds to a scan range of an effective beam emission area of FIG. 14. The opposite portions of the one scan period each represent non-irradiation times corresponding to a null image area, which corresponds to a beam shielding area of FIG. 14.

As described above, in the first embodiment, the scan span controller 11 determines the start and stop timings of the laser beam irradiation during a one-scan period required for the scan mirror to make a complete scan, while following the drive state of the scan mirror, generates a laser beam irradiation on/off signal ⑤ turned on and off within the one-scan period based on the determined start and stop timings, and controls the turning on/off of the laser beam in accordance with the laser beam irradiation on/off signal ⑤ to thereby control the scan span in which the laser beam is actually turned on within the one-scan period. Thus, useless laser beam irradiation is prevented to thereby reduce the power consumption. Presetting optional values in the start and stop timing control registers 11-5 and 11-6 serves to control the laser beam scan span easily and freely. Since the irradiation start and stop timings are determined separately, the scan span control is easily provided even in the case of the vibration type mirror in which the scan velocity is nonlinear. In addition, since the turning on/off of the laser beam is dependent on the timing control, only a simple electronic circuit is required to be added to the conventional system to this end to thereby avoid the problem with a space for installation in the conventional device.

Second Embodiment

Figure 3:
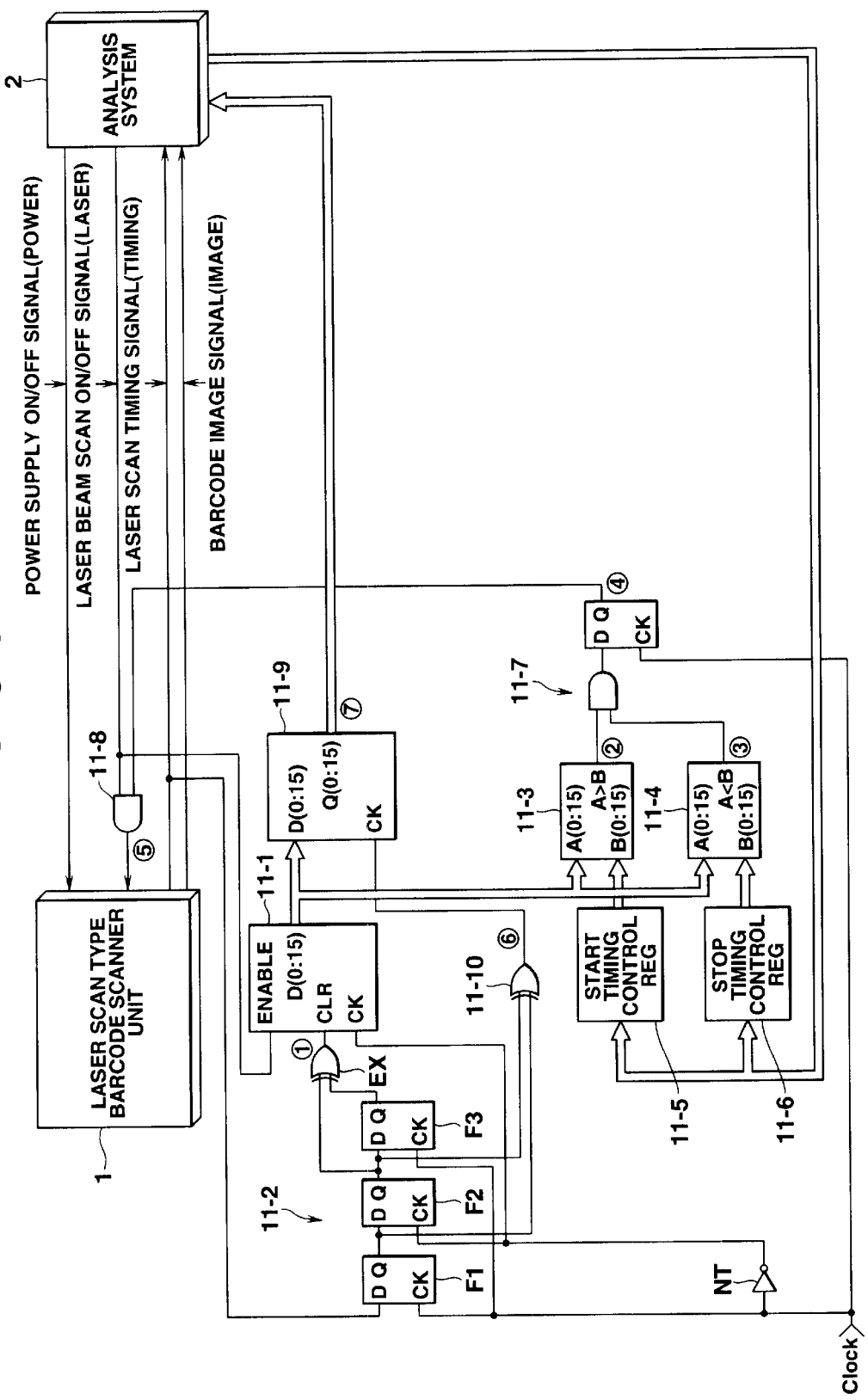
FIG. 3 is a block diagram of a second embodiment.
Figure 4:
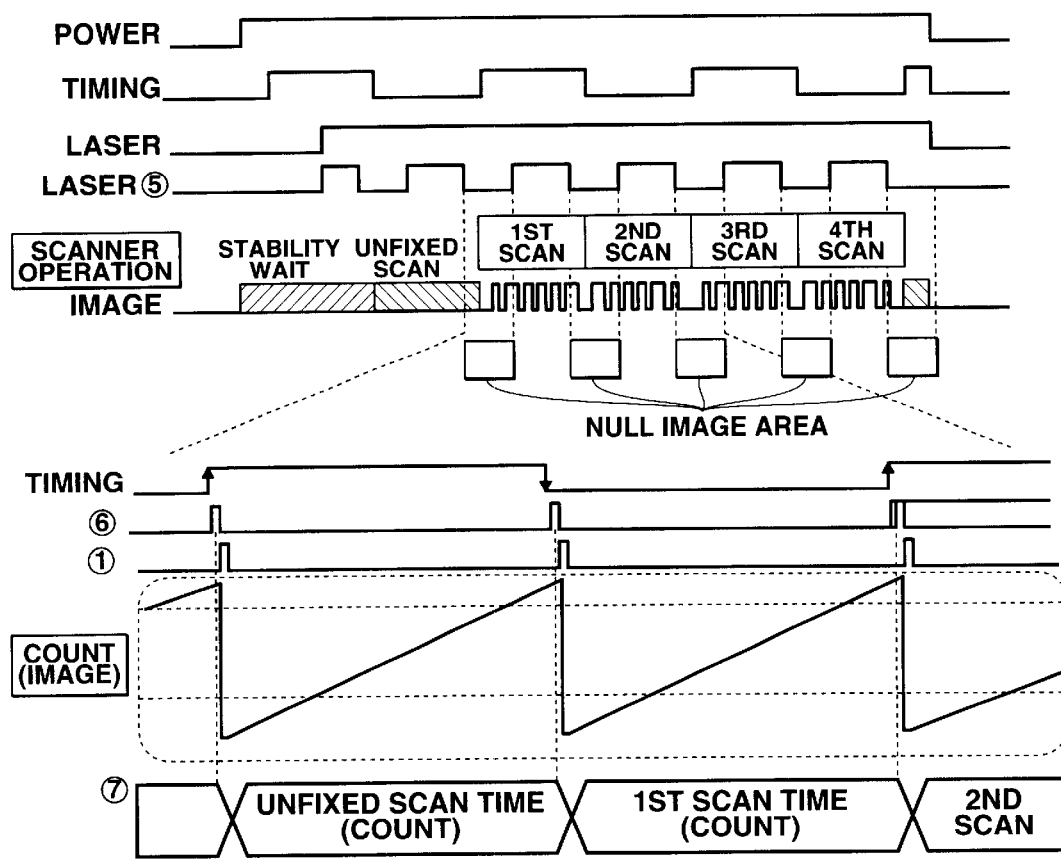
FIG. 4 is a timing chart of operation of the second embodiment.

Referring to FIGS. 3 and 4, a second embodiment of the present invention will be described next. FIG. 3 more specifically illustrates the composition of a scan span controller 11 of the second embodiment. Since the scan span controller 11 of FIG. 3 is basically the same as that of the first embodiment of FIG. 1, elements of basically the same function are identified with the same reference numeral in FIGS. 3 and 1, and further description thereof will be omitted. While in the first embodiment the values in the start and stop timing control registers 11-5 and 11-6 are illustrated as being set at any desired (fixed) ones, the scan period of the scan mirror varies depending on structural, functional and characteristic deviations of the scanner unit from the standards and its environment of use. Thus, if the values in the start and stop timing control registers 11-5 and 11-6 are fixed, the laser beam irradiation start and stop timings can deviate from the standards for each scan. In order to avoid this undesirable situation, those values are determined based on measured values in one scan period in this embodiment. More specifically, a scan period measuring register 11-9 which gets a maximum count in one scan period measured by the scan timing measuring counter 11-1 is provided such that set values in the registers 11-5 and 11-6 are determined based on the maximum count in the one scan gotten by the register 11-9. In the second embodiment, the clear signal generator 11-2 which clears the scan timing measuring counter 11-1 is comprised of three-staged D flip-flops F1, F2 and F3 with Q outputs from the second and third flip-flops being delivered to an exclusive OR gate EX to clear the scan timing measuring counter 11-1 and with Q outputs from the first and second flip-flops being delivered to an exclusive OR gate 11-10.

A pulse signal ⑥ output from the exclusive OR 11-10 is delivered as a clock signal CK to a scan period measuring register 11-9 and the register 11-9 gets a value in the scan timing measuring counter 11-1 in accordance with the pulse signal ⑥. The second embodiment includes a circuit which produces a pulse which causes a value in the scan timing measuring counter 11-1 to be input to the scan period measuring register 11-9 in accordance with a change point of the scan timing signal, and a circuit which produces a pulse to clear the scan timing measuring counter 11-1. The output from the register 11-9 is a maximum count ⑦ in one scan.

Operation of the second embodiment will be described next with reference to a timing chart of FIG. 4. It is basically the same as that of the first embodiment. Thus, the features of the operation of the second embodiment will now be mainly described. When the scan timing signal changes, the clear signal generator 11-2 generates a pulse signal ① and the exclusive OR gate 11-10 produces a pulse signal ⑥ immediately before the clear signal generator 11-2 generates a pulse signal ①. Thus, a value in the scan timing measuring counter 11-1 present immediately before the scan timing measuring counter 11-1 is cleared is gotten by the scan period measuring register 11-9. In this case, the value in the scan timing measuring counter 11-1 increases gradually as shown by the count (image) of FIG. 4 to a maximum count in the one scan immediately before it is cleared, and this maximum count is gotten by the scan period measuring register 11-9. That is, by adding the function of automatically getting the maximum count in one scan to the reader, the analysis system 2 can determine set values in the start and stop timing control registers 11-5 and 11-6 based on the maximum count (automatically measured time).

As described above, since in the second embodiment the scan period which changes due to structural, functional and characteristic deviations of the scanner unit 1 from the standards is measurable only by causing the scanner unit 1 to operate, the scan span of the laser beam irradiation by control of the irradiation start and stop timings is set accurately.

Third Embodiment

Figure 5:
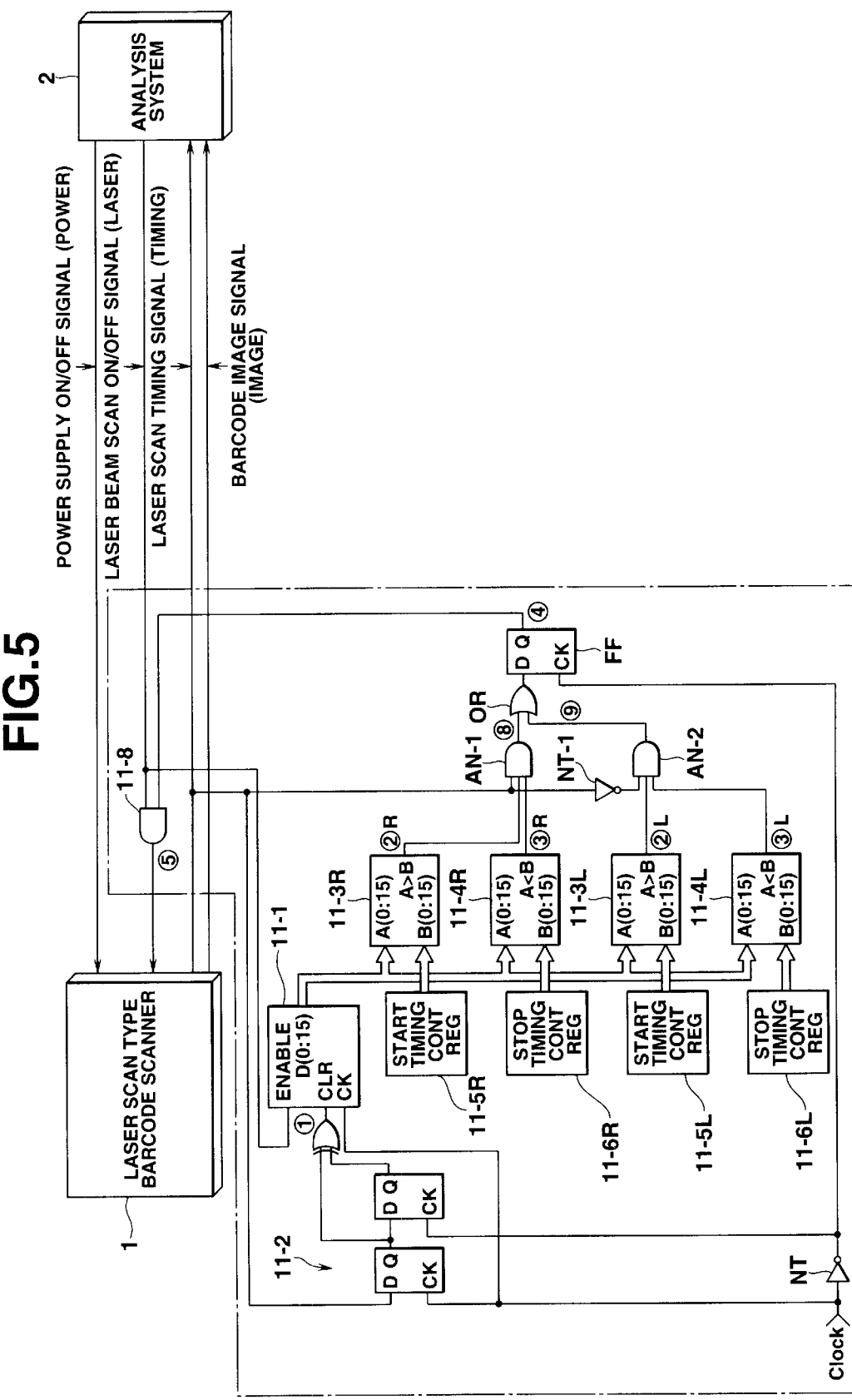
FIG. 5 is a block diagram of a third embodiment.
Figure 6:
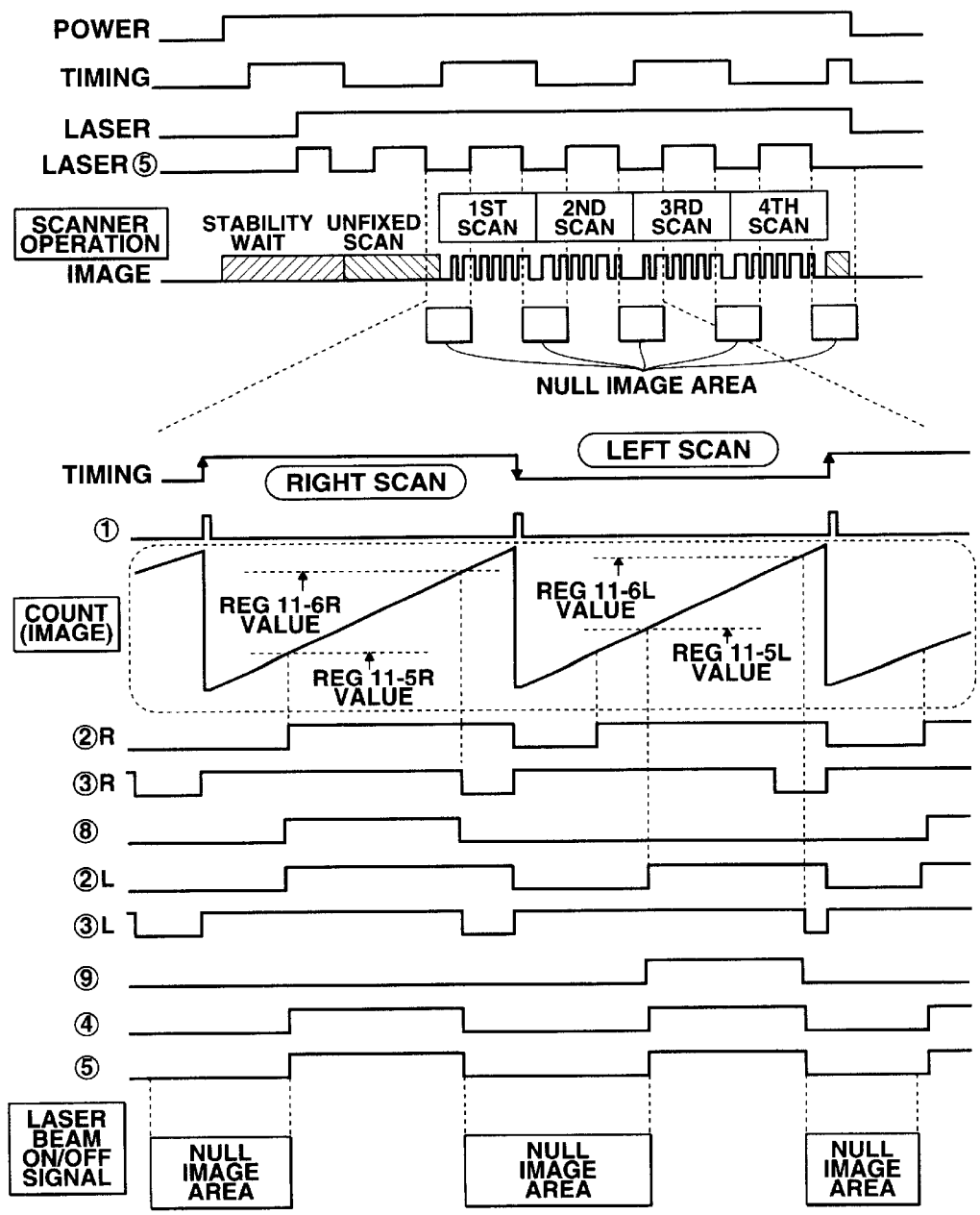
FIG. 6 is a timing chart of operation of the third embodiment.

Referring to FIGS. 5 and 6, a third embodiment of the present invention will be described next. FIG. 5 shows the composition of a scan span controller 11 of the third embodiment which is basically the same as that of FIG. 1. Thus, elements of basically the same function are identified with same reference numeral and further description thereof will be omitted. While in the first embodiment any one of the vibration and polygon mirrors is shown as usable, a vibration type scan mirror is used in the third embodiment such that each time the scan direction is reversed to the right by the scan mirror, the right scan irradiation start and stop timings are determined to thereby control the scan span in the right scan direction. Similarly, each time the scan direction is reversed to the left by the scan mirror, the left scan irradiation start and stop timings are determined to thereby control the scan span in the left scan direction.

Laser beam irradiation start/stop determining comparators and registers are provided for each of the right and left scans. More particularly, a start determining comparator 11-3R and a stop determining comparator 11-4R are for the right scanning purpose, and a start determining comparator 11-3L and a stop determining comparator 11-4L are for the left scanning purpose. A start timing control register 11-5R and a stop timing control register 11-6R are for the right scanning purpose. A start timing control register 11-5L and a stop timing control register 11-6L are for the left scanning purpose. Each of the start determining comparators 11-3R, 11-3L, and the stop determining comparators 11-4R, 11-4L receives a count in the scanning timing measuring counter 11-1 and compares it with a corresponding register value. The functions of those comparators are similar to those of the corresponding comparators of the first embodiment. In addition, the scanning timing measuring counter 11-1 is cleared by a pulse signal ① from the clear signal generator 11-2 as in the first embodiment. In the third embodiment, an AND gate AN-1 performs an AND operation on a scan timing signal which is inverted in accordance with a scan direction and outputs from the start and stop determining comparators 11-3R and 11-4R to provide a signal ⑧ indicative of an irradiation range in the right scan. An AND gate AN-2 performs a logical AND operation on a signal which includes an inverted version of the scan timing signal obtained via an inverter NT-1 and outputs from the start and stop determining comparators 11-3L and 11-4L to provide a signal ⑨ indicative of an irradiation range in the left scan.

Then, the outputs from the AND gates AN-1 and AN-2 are delivered via an OR gate to a D input terminal of the D flip-flop FF to produce a laser beam mask signal ④, which is then delivered to an AND gate 11-8 which controls the laser beam signal.

Operation of the third embodiment will described with reference to a timing chart of FIG. 6. High and low scanning timing signals represent right and left scans, respectively. Each time the level of the scanning timing signal changes, the clear signal generator 11-2 outputs a pulse signal ① to clear the scanning timing measuring counter 11-1. In the right scan, the AND gate AN-1 is opened to perform an AND operation on the right scan start and stop timing signals ② R and ③ R to thereby provide a signal ⑧ indicative of an irradiation range in the right scan and hence to produce a laser beam mask signal ④ and an actual laser beam scan on/off signal ⑤. In the right scan, the AND gate AN-2 is opened to perform an AND operation on the left scan start and stop timing signals ② L and ③ L to thereby provide a signal ⑨ indicative of a left scan irradiation range and hence to produce a laser beam mask signal ④ and an actual laser beam scan on/off signal ⑤.

As described above, since in the third embodiment the laser beam irradiation range is set in each scan direction, right and left laser beam scan span ranges are caused to coincide to thereby prevent occurrence of a deviation between the reading ranges in the right and left scan directions even when curves indicative of right and left scan velocities are not axial-symmetrical due to the scanning characteristics of the vibration mirror and structural, functional and characteristic deviations of the scanner unit from the standards.

Fourth Embodiment

Figure 7:
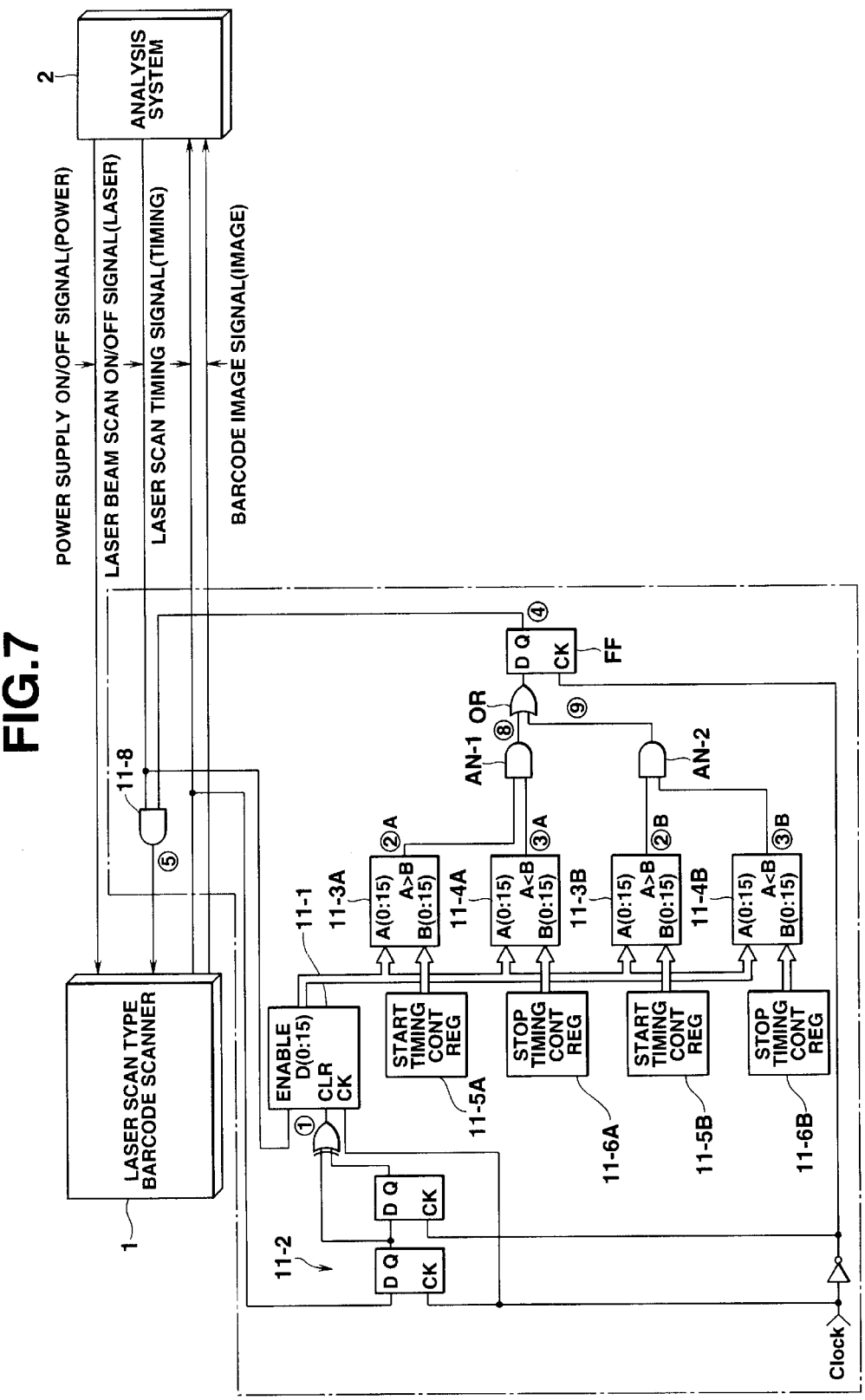
FIG. 7 is a block diagram of a fourth embodiment.
Figure 8:
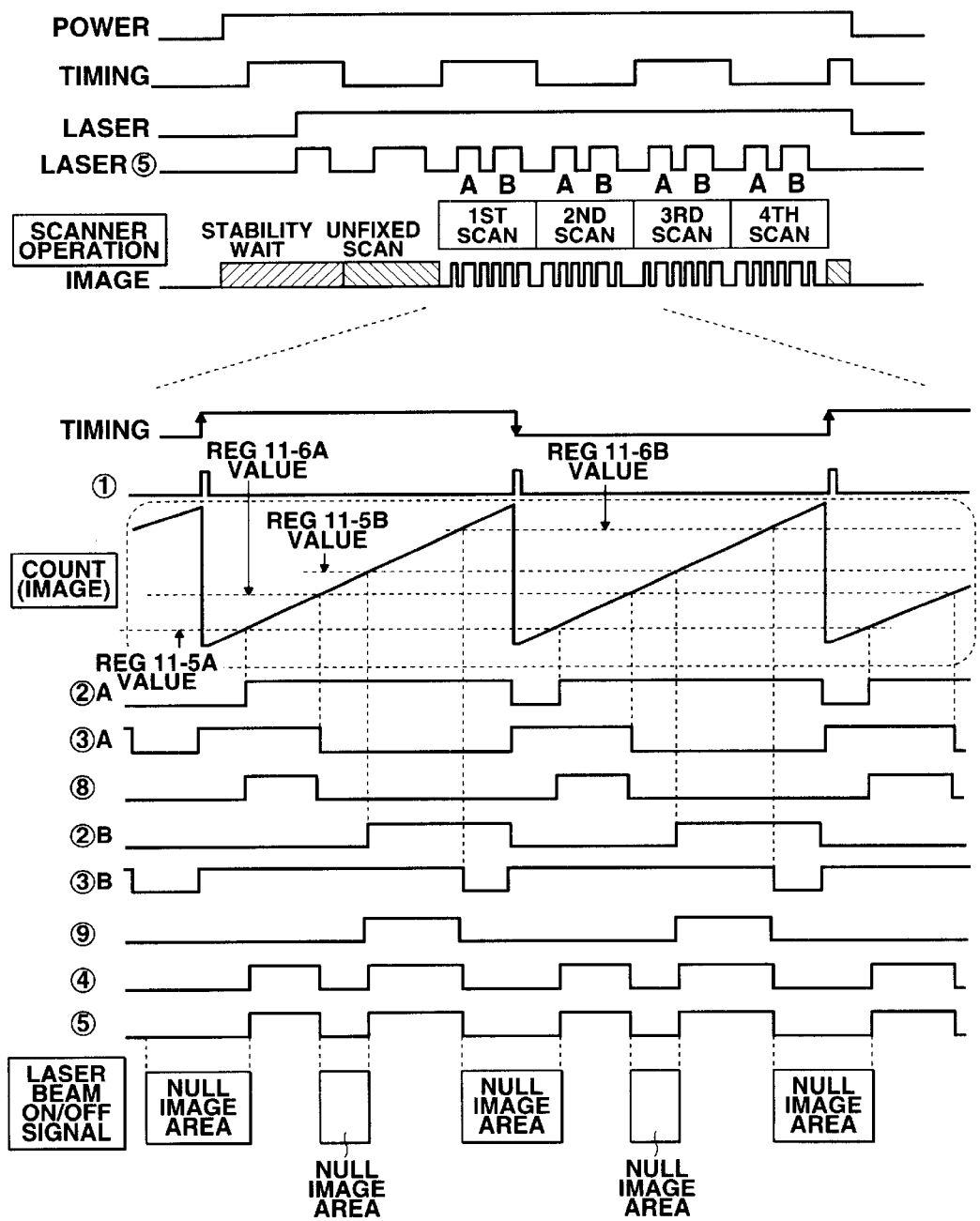
FIG. 8 is a timing chart for illustrating operation of the fourth embodiment.

Referring to FIGS. 7 and 8, a fourth embodiment of the present invention will be described next. FIG. 7 illustrates the composition of a scan span controller 11 of the fourth embodiment, which is basically the same as that of the third embodiment of FIG. 5. Elements having the basically the same function in FIGS. 7 and 5 are identified by the same reference numeral. While in the fourth embodiment two pairs of laser beam irradiation start and stop timing determiners are provided as in the third embodiment, no scan spans are set in each scan direction, using scan timing signals, but two scan spans are set in one scan period.

More specifically, it includes two pairs of laser beam irradiation start and stop timing determiners which are start determining comparators 11-3A and 11-3B; stop determining comparators 11-4A and 11-4B; start timing control registers 11-5A, 11-5B; and stop timing control registers 11-6A and 11-6B. In order that the third embodiment of FIG. 5 uses the two pairs of determiners to change the scan span twice in each scan direction, the scan timing signal is directly input to the AND gate AN-1 and its inverted signal is input to the AND gate An-1. However, the fourth embodiment of FIG. 7 does not change scan spans with the scan timing signal. Set values in the respective registers are such that the value in the start timing control register 11-5A<the value in the stop timing control register 11-6A<the value in the start timing control register 11-5B<the value in the stop timing control register 11-6B.

Operation of the fourth embodiment will be described with reference to a timing chart of FIG. 8. After the scan timing measuring counter 11-1 is cleared, its value gradually increases as shown by a count (image) of FIG. 8. Since it first reaches the value in the start timing control register 11-5A and then the value in the stop timing control register 11-6A, the AND gate performs an AND operation on the outputs from the start and stop determining comparators 11-3A and 11-4A to provide a signal ⑧ indicative of a first irradiation range. Since the value of the counter 11-1 reaches the value in the start timing control register 11-5B and then the value in the stop timing control register 11-6B, the AND gate AN-2 performs an AND operation on the outputs from the start and stop determining comparators 11-3B and 11-4B to provide a signal ⑨ indicative of a second irradiation range. A laser beam mask signal ④ is output twice for each scan in a corresponding direction by a logical OR operation on the signals ⑧ and ⑨. Thereafter, the above operations are repeated in each scan operation.

As described above, since two scan spans are set in each scan in the corresponding direction in the fourth embodiment, various methods of utilization are possible. For example, during the time when two barcodes adjacent in the scan direction can be scanned by a single scanner unit to thereby read the barcode images. Even when two barcodes are greatly spaced in the scan direction, they can be read in one scan by two irradiating or reading ports provided separately for the two barcodes in a scanner unit when the laser beam is separated in correspondence to two irradiation ranges so as to be irradiated on the two barcodes from the two irradiating or reading ports.

Fifth Embodiment

Figure 9:
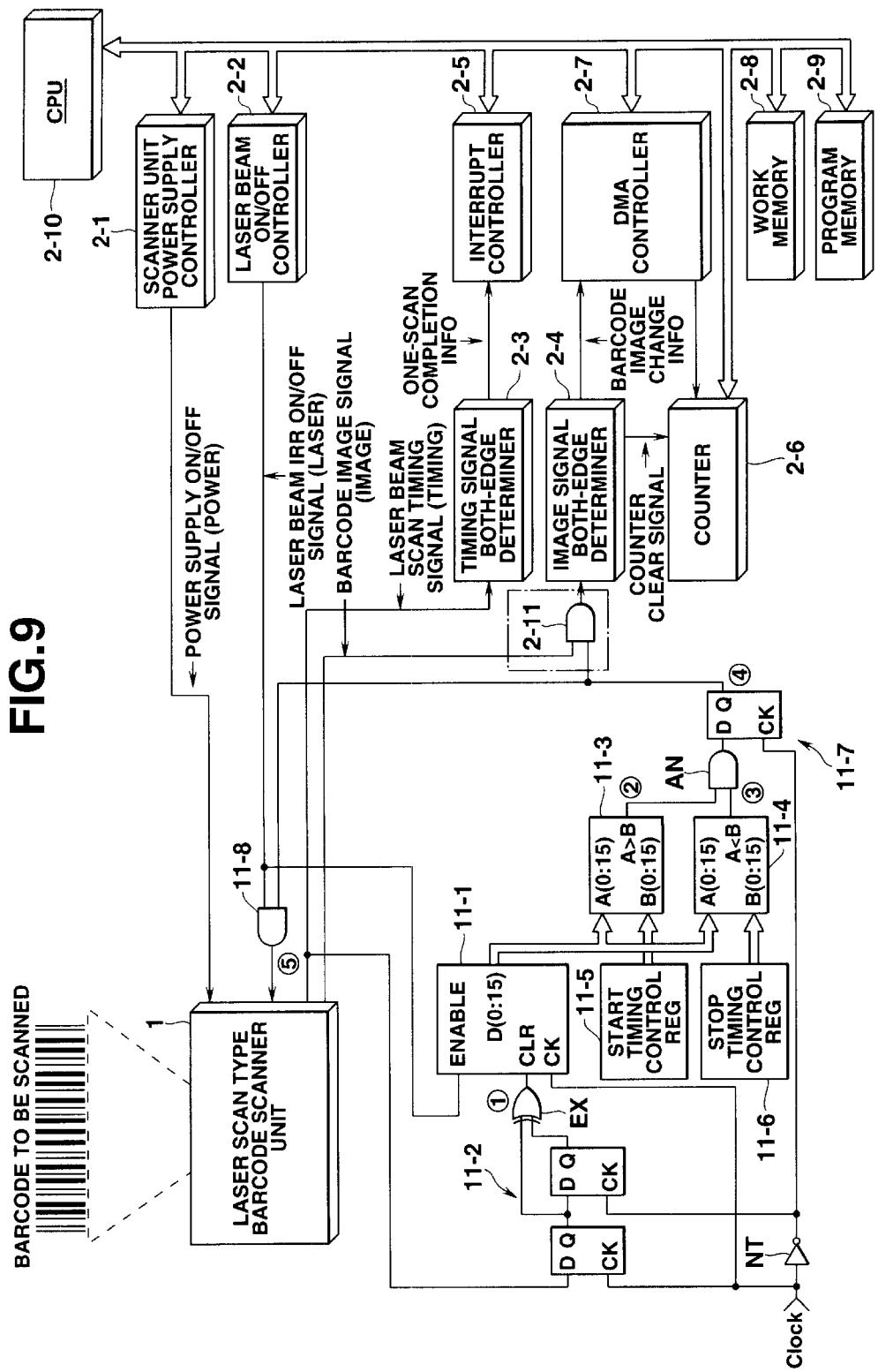
FIG. 9 is a block diagram of a fifth embodiment.
Figure 10:
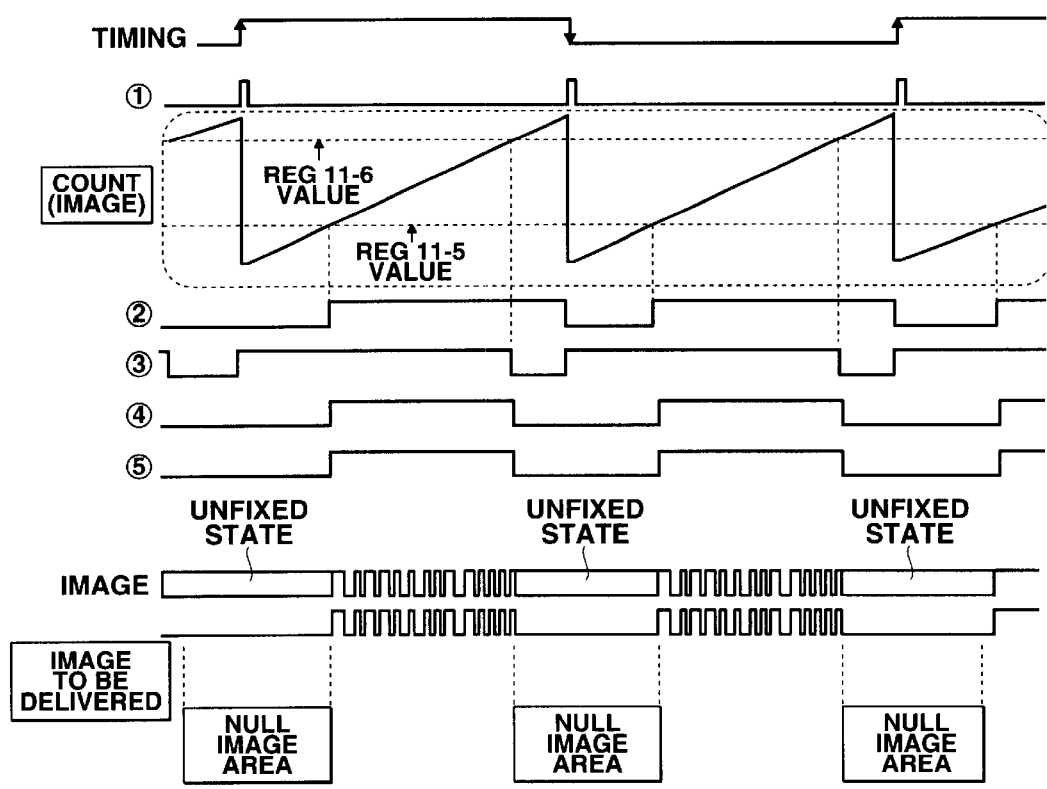
FIG. 10 is a timing chart of operation of the fifth embodiment.

Referring to FIGS. 9 and 10, the fifth embodiment of the present invention will be described next. A scan span controller 11 of the fifth embodiment is similar in composition to the first embodiment of FIG. 1 in which the scan span of the laser beam actually turned-on is controlled in each scan period. The fifth embodiment is constructed such that it does not pick up external light, motor noise, etc., even when it is exposed to them when the laser beam is off during each scan period in order to avoid a resulting wrong operation.

To this end, an AND gate 2-11 is provided which performs an AND operation on a laser beam mask signal ④ output from a mask signal generator 11-7 and a barcode image signal output from the scanner unit 1 to provide a resulting signal to an image signal both-edge determiner 2-4.

As shown in a timing chart of FIG. 10, since a period during which the barcode image signal is unfixed is masked by the laser beam mask signal ④, the output from the AND gate 2-11 is delivered as a barcode image corresponding to an irradiation range to the analysis system 2, as shown.

As described above, the barcode image signal output from the scanner unit 1 is masked by the laser beam mask signal ④ which controls the laser beam irradiation range. Thus, the analysis system 2 does not transfer data due to a change in the barcode image signal outside the irradiation range. Therefore, a power loss and a decrease in the system performance due to meaningless data transfer are avoided. Since the meaningless data transfer is reduced, the analysis time required for the barcodes is reduced, advantageously.

While the respective above mentioned embodiments each are composed by digital circuits such as counters and comparators, the counters and comparators may be realized by CR circuits and analog comparators. The time setting by the registers may be realized with variable resistors of CR circuits. The function of the scan span controller 11 may be realized by corresponding programs in the respective embodiments, of course.

While in the fourth embodiment the two pairs of setting registers and determiners are provided, three or more pairs of setting registers and determiners may be provided. Also, in the third embodiment, two or more pairs of setting registers and determiners may be provided for each scan direction.

Sixth Embodiment

Figure 11:
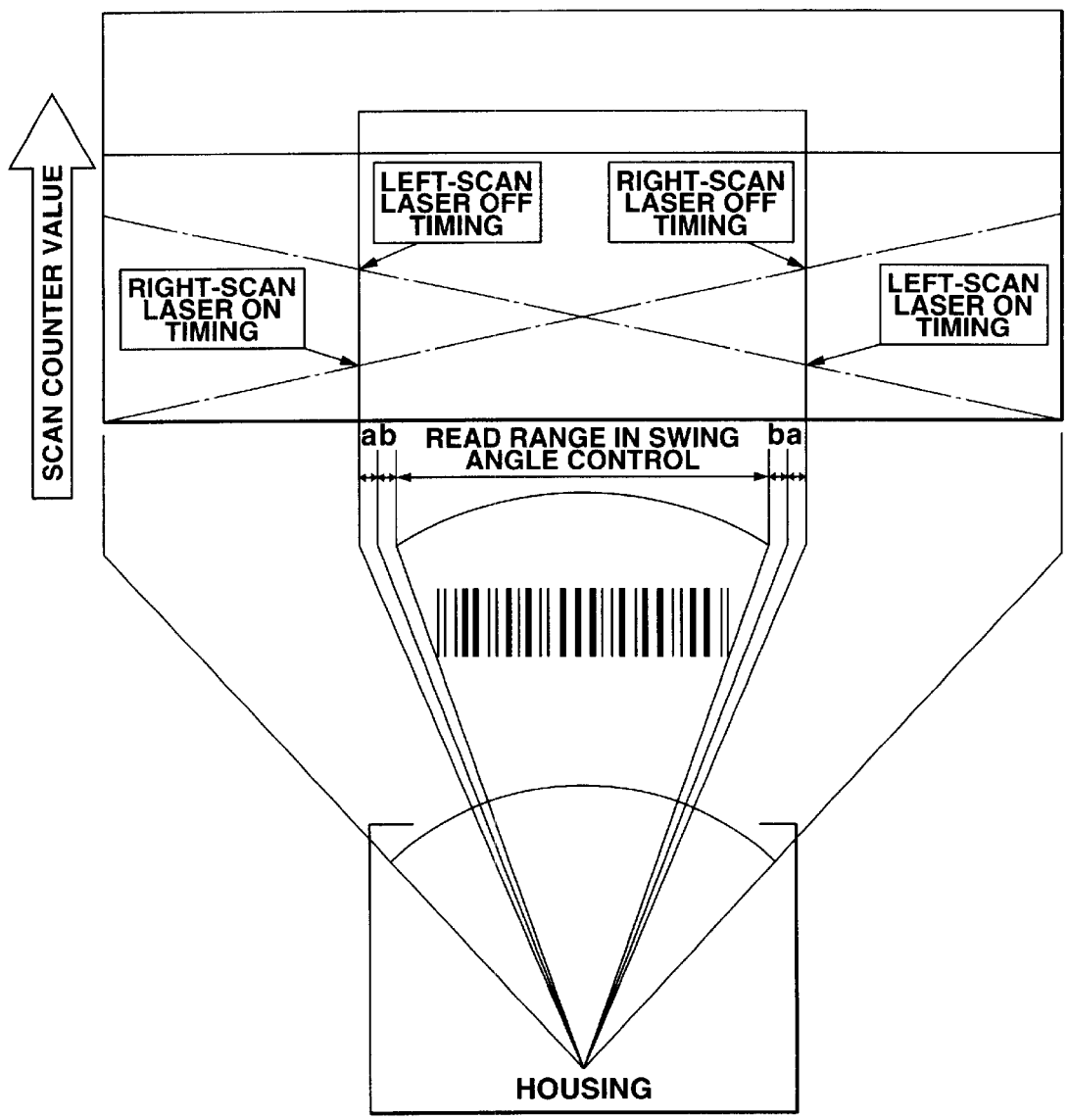
FIG. 11 illustrates a scan span performed in an ideal scanner unit which is free from the above-mentioned deviations as a premise for illustrating the features of a sixth embodiment.
Figure 12:
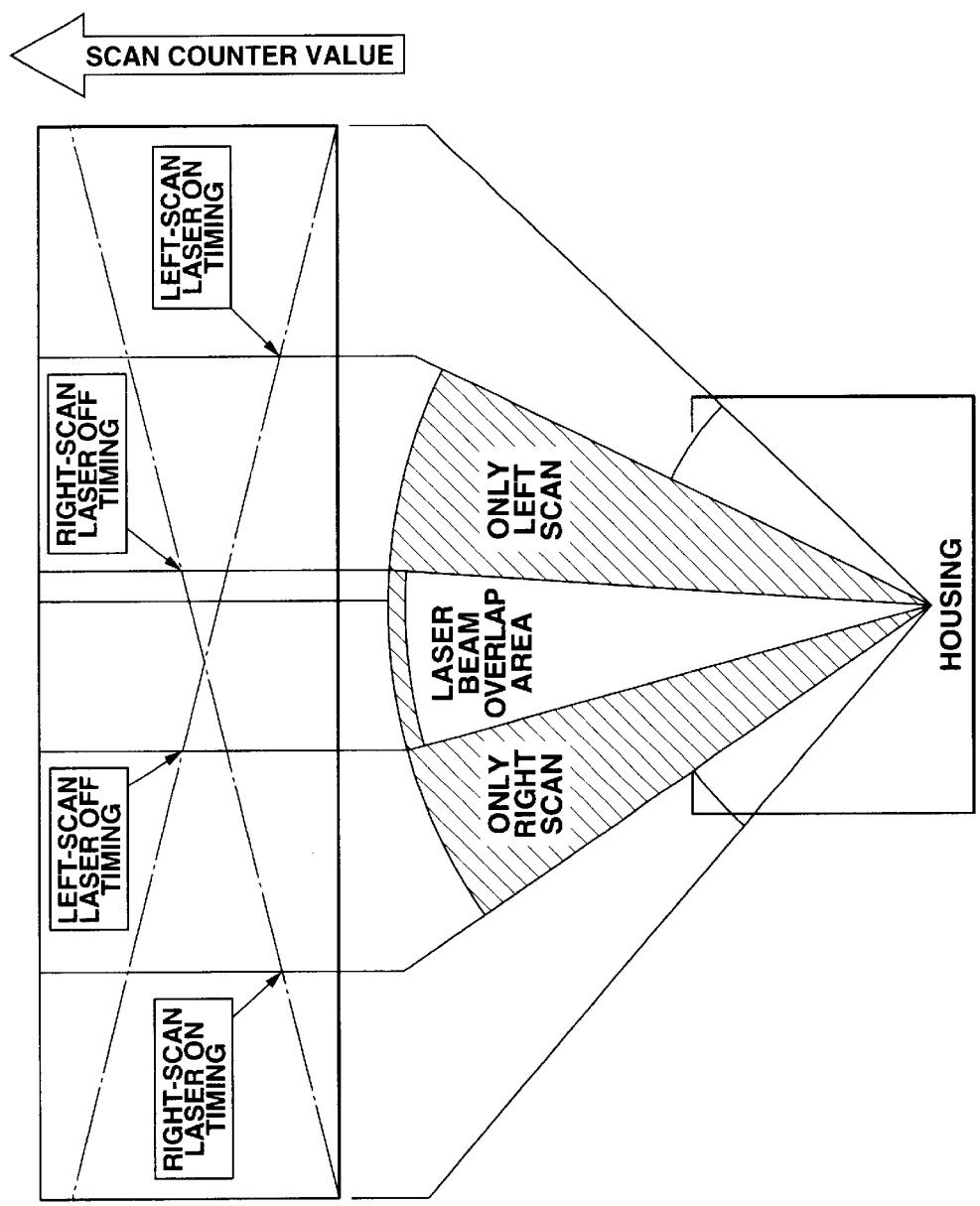
FIG. 12 illustrates a scan span given when the deviations of the scanner unit are worst on the same premise as in FIG. 11.

Referring to FIGS. 11-27E, a sixth embodiment of the present invention will be described next. While in the respective embodiments the start and stop timing control registers are provided whose values are individually set, it is important in the scan span control what set values should be set in the respective registers to eliminate the influence of structural, functional and characteristic deviations of the scanner unit from the standards. Those deviations include a scan velocity, a scan velocity characteristic, a scan angle and a scan mirror attaching angle. The scan span control of an ideal scanner free from such deviations is as shown in FIG. 11 where the turning-on timing of the laser beam in the right scan coincides with the turning-off timing of the laser beam in the left scan, and the turning-on timing of the laser beam in the left scan coincides with the turning-off timing of the laser beam in the right scan. Thus, the scan ranges of the right and left scans completely coincide with each other, as shown in FIG. 12. When the deviations of the scanner unit are worst, the turning-on timing of the right scan deviates greatly from the turning-off timing of the left scan and the tuning-off timing of the left scan also deviates greatly from the turning-on timing of the right scan. Therefore, the overlapping range of the right and left scans is limited to a common central portion of the scan ranges. Thus, areas which are irradiated with the laser beam only in the right and left scans are present on the corresponding opposite sides of the common central scanning range portion. Thus, the barcode cannot be accurately read in both the right and left scans depending on the size of the barcode as the case maybe.

Figure 13:
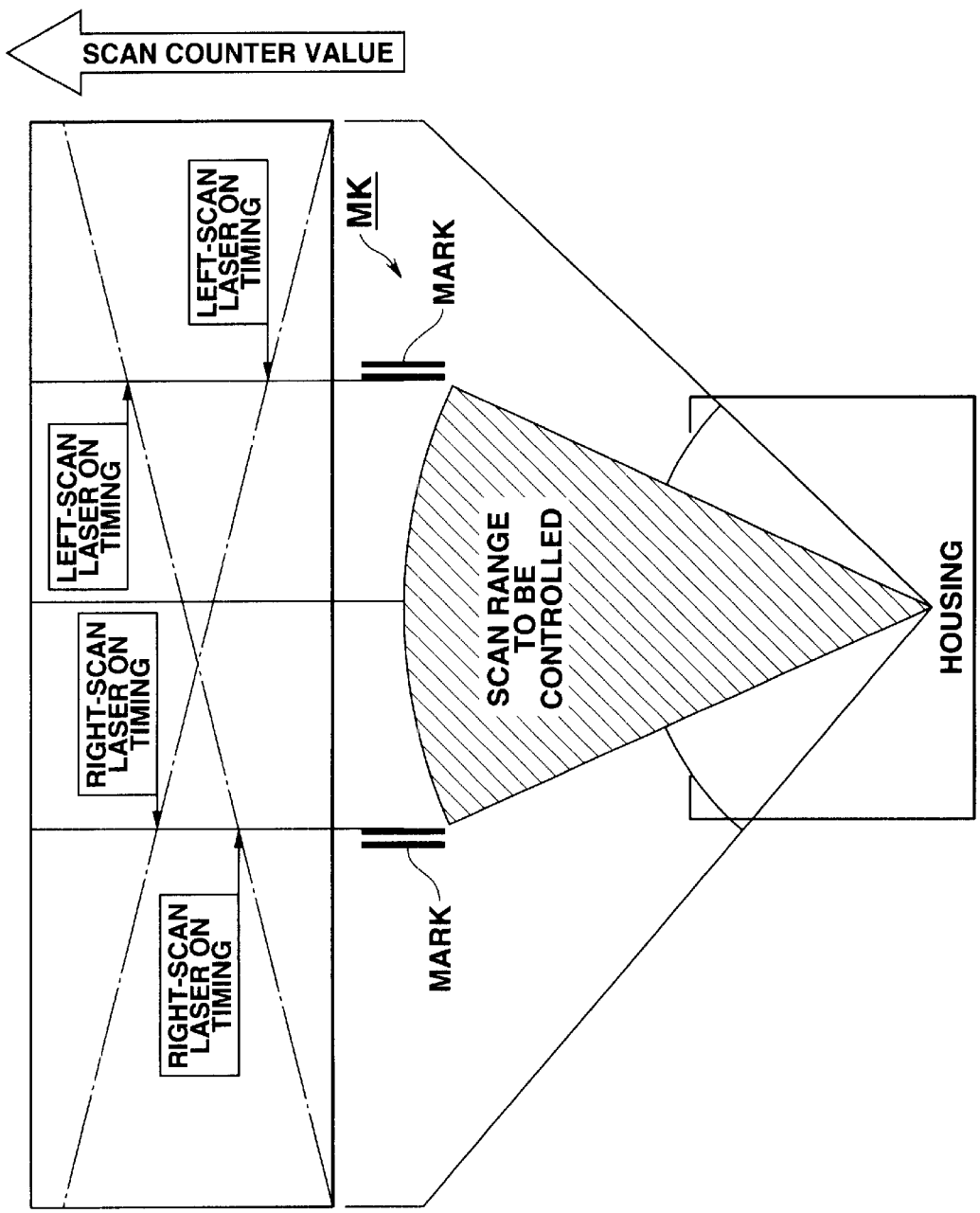
FIG. 13 illustrates ideal scan span control provided in the sixth embodiment even when the deviations of the scanner unit are worst.

In order to avoid this undesirable case, the sixth embodiment realizes ideal scan span control as shown in FIG. 13 even when the deviations of the scanner unit from the standards are worst. More specifically, three pairs of differently spaced marks MK are arranged on the reader housing or a portable card. Each pair of marks are read by the scanner unit 1 so as to cope with changes in the scanner operation due to its deviations, mentioned above, as well as its environment of use and aging to thereby achieve ideal scan span control. The pair of marks MK are used for specifying an optimal scan span, or optimal start and stop positions of the laser beam irradiation, to read the target barcode depending on a size of the barcode. Each mark includes two left thick black bars and a thinner white space or bar between the two thick black bars. The left one of the marks of each pair is used for specifying the turn-on and off positions of the right and left scans, respectively. The right one of the marks of the pair is used for specifying the turn-on and off positions of the left and right scans, respectively. The details of the marks MK will be described later.

Figure 14:
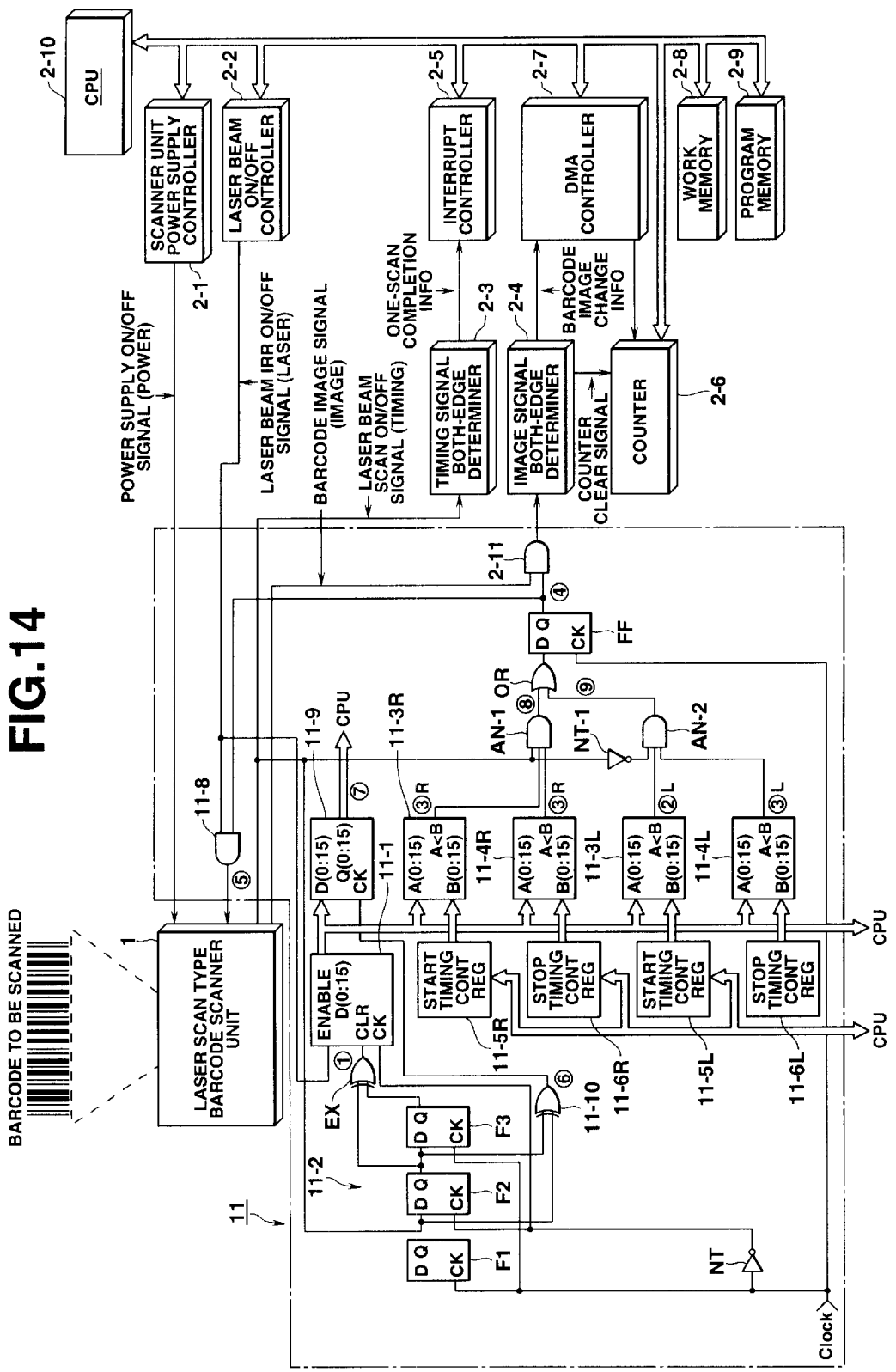
FIG. 14 is a block diagram of a whole system of the sixth embodiment where the scan span controller is illustrated in detail.

FIG. 14 is a block diagram of a whole system where the scan span controller 11 is illustrated in more detail. The scan span controller 11 of the sixth embodiment basically comprises a combination of the features of the second, third and fifth embodiments. More specifically, the scan timing measuring counter 11-1 of this embodiment measures the present scan timing following the movement of the scan mirror during the present one scan period of the scan mirror. When a laser beam irradiation on/off signal is input from the system 2 to the enable terminal of the scan span controller 11, the same performs a counting operation synchronously with a clock signal received from an inverter NT to measure the time required from a change point of the scan timing signal to its next change point. In this case, since the clear signal generator 11-2 outputs a pulse signal ① each time the scan timing signal changes to clear the counter 11-1, the value of the counter 11-1 represents a time required for the scan mirror 1 to perform a complete one scan. The clear signal generator 11-2 comprises three-staged D flip-flops F1, F2 and F3 and an exclusive OR gate EX which receives Q outputs from the second and third flip-flops F2 and F3. A scan timing signal from the scanner unit 1 is input to a D input terminal of the first flip-flop F1. A clock signal is directly delivered to the first and third flip-flops F1 and F3, and delivered via the inverter NT to the second flip-flop F2. The Q outputs from the first and second flip-flops F1 and F2 are delivered to the exclusive OR gate 11-10 which outputs and delivers a pulse signal ⑨ as a clock signal CK to the scan cycle measuring register 11-9. The scan cycle measuring register 11-9 gets the value of the scan timing measuring counter 11-1 in accordance with the pulse signal ⑥.

In the sixth embodiment, the right scan irradiation start and stop timings, and the left scan start and stop timings are determined each time the vibration type scan mirror changes its scan direction between right and left, respectively, to control the scan span in the respective scan directions as in the third embodiment. Thus, two pairs of comparators and registers are prepared for determining the laser beam irradiation start and stop for right and left scans; that is, a start determining comparator 11-3R and a stop determining comparator 11-4R are for the right scan, and a start determining comparators 11-3L and a stop determining comparator 11-4L are for the left scan; a start timing control register 11-5R and a stop timing control register 11-6R are for the right scan; and a start timing control register 11-5L and a stop timing control register 11-6L are for the left scan. The start determining comparators 11-3R, 11-3L, and the stop determining comparators 11-4R, 11-4L each receive a count from the scan timing measuring counter 11-1, compares this count with a corresponding register value. The functions of the comparators are similar to those of the corresponding ones of the first embodiment. In the sixth embodiment, the scan timing measuring counter 11-1 of the scan span controller 11 is connected via a bus line to a CPU 2-10 of the system 2. The start timing control registers 11-5R and 11-5L, and the stop timing control registers 11-6R, 11-6L are also connected via bus lines to the CPU 2-10, which sets scan span control values in the respective registers. By causing the respective three pairs of marks MK to be read with the scanner unit 1, ideal scan span control values which can cope with changes in the scanner operation due to structural, functional and characteristic deviations of the scanner from the standards and a change in the environment of use and aging of the scanner unit are preset in the respective registers.

When a maximum count value in one scan period measured by the scan timing measuring counter 11-1 is gotten by the scan cycle measuring register 11-9, the CUP 2 of the system 2 determines the respective set values of the registers based on the maximum count value as in the second embodiment and sets the determined vales in the respective registers.

The AND gate AN-1 performs a logical AND operation on the scan timing signal which is inverted depending on the scan direction and outputs from the right scan start determining comparator 11-3R and the stop determining comparator 11-4R to generate an output signal ⑧ indicative of an irradiation range in the right scan. The AND gate AN-2 performs a logical AND operation on an inverted version of the scan timing signal provided via the inverter NT-1 and outputs from the start determining comparator 11-3R and the stop determining comparator 11-4R to generate an output signal ⑨ indicative of an irradiation range in the left scan. By delivering the outputs from the AND gates AN-1 and AN-2 via the OR gate OR to the D input terminal of the D flip-flop FF, a laser beam mask signal ④ is produced, which is then delivered to an AND gate 11-8 which controls the laser beam irradiation on/off signal. As in the fifth embodiment, an AND gate 211 performs a logical AND operation on the laser beam mask signal ④ and the barcode image signal output from the scanner unit 1 to provide an output to the image signal both-edge determiner 2-4.

Figure 15:
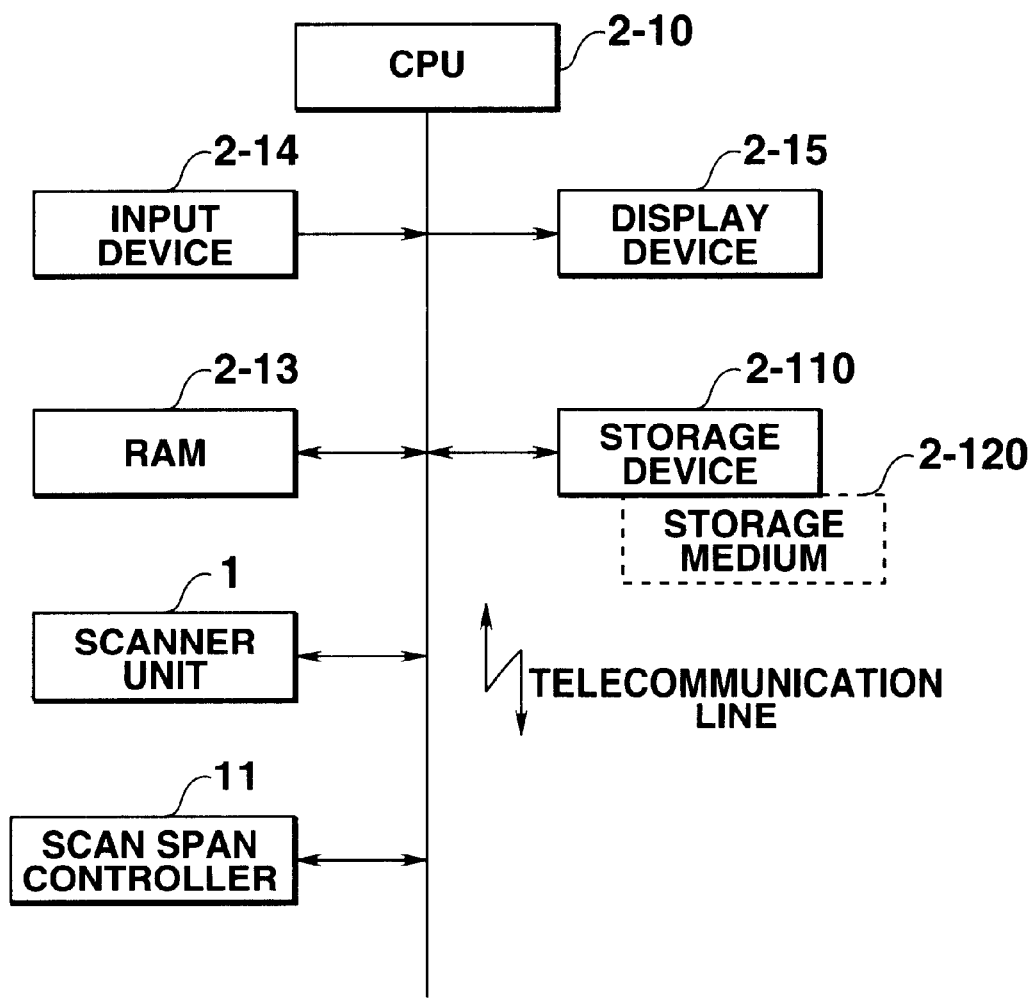
FIG. 15 is a block diagram of a whole composition of the analysis system 2.

FIG. 15 is a block diagram of the analysis system 2. The CPU 2-10 controls the whole operation of the system 2 in accordance with various programs. A storage device 2-110 includes a storage medium 2-120 which contains an operating system, various application programs, data files, character font data, etc., and its drive system. The storage medium 2-120 is a fixed or a removably set one composed of a floppy disk, a hard or optical disk, a magnetic/optical recording medium such as a RAM card, or a semiconductor memory. Programs and data in the storage medium 2-120 are loaded on a RAM 2-13 as requested under control of the CPU 2-10, which receives programs and data from another device via telecommunication lines and stores them in the storage medium 2-120 or uses the programs and data stored in a storage medium provided in another device via telecommunication lines. The CPU 2-10 is connected via bus lines to its input/output peripheral devices which are the scanner unit 1, the scan span controller 11, the input device 2-14 and the display device 2-15 such that the CPU 2-10 controls the operations of the respective devices in accordance with input/output programs.

The input device 2-14 includes a keyboard by which various character string data and various commands are input, and a pointing device such as a mouse. When character string data is input from the input device 2-14, it is displayed on a text screen of the display device 2-15 and also stored in the RAM 2-13. The display device 2-15 includes a liquid crystal display device, a CRT or a plasma display device which display information in a multi-color.

Figure 17A:
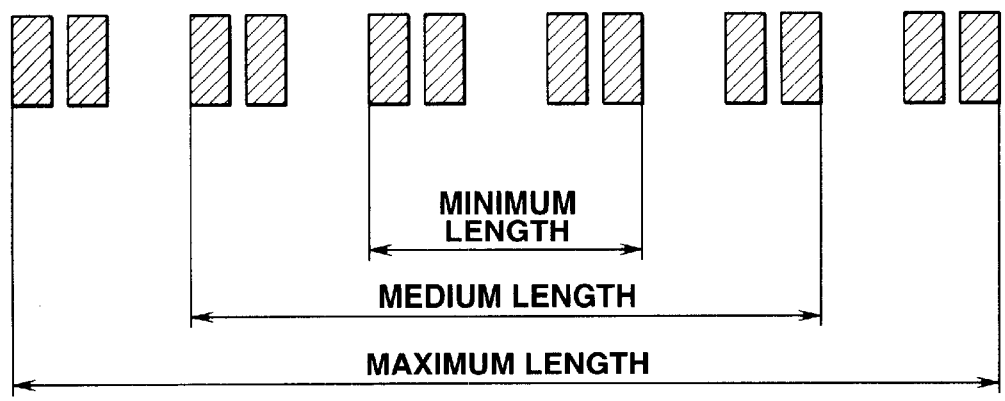
FIGS. 17A and B illustrate arrangement of three pairs of spaced marks MK used for specifying laser beam irradiation start and stop positions and a composition of one mark MK, respectively.

FIG. 16 shows various data temporarily stored in a work memory of the RAM 2-13 and obtained in a process for specifying scan positions by reading the three pairs of differently spaced marks MK with the scanner unit 1. A "capture value" indicates a value of image data (bar image length) read this time by laser beam scanning the three pairs of marks MK, and a "preceding capture value" indicates a value of image data (bar image length) read last time. The work memory stores three different pairs of the right scan start and stop data and three different pairs of left scan start and stop data. As shown in FIG. 17A, each pair of marks MK specify the opposite ends of a barcode in accordance with the length of the barcode. More particularly, the three pairs of marks corresponding to different barcodes of a minimum, an medium, and a maximum length are disposed such that a pair of marks corresponding to the opposite positions of the barcode of a minimum length are disposed between a pair of marks corresponding to the opposite positions of the barcode of an medium length and that the last-mentioned pair of marks are disposed between a pair of marks corresponding to the opposite positions of the barcode of a maximum length. The three pairs of marks are arranged on a straight line such that when the three pairs of marks MK are scanned by the scanner unit 1, the three pairs of marks corresponding to the maximum, medium and minimum lengths of the three different barcodes are read in the respective right and left scans. The CUP 2-10 obtains right scan start/stop data, and left scan start/stop data for each of the maximum, medium and minimum lengths of barcodes, and stores them in the mark memory. The start and stop data are time data measured by the scan timing measuring counter 11-1.

Figure 17B:
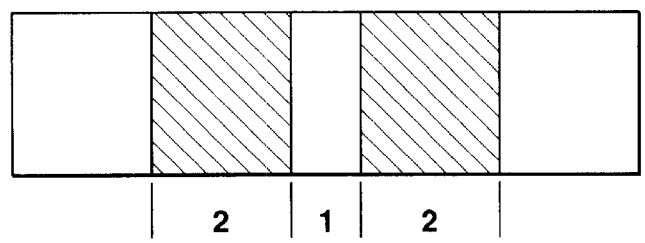

FIG. 17B illustrates one mark composed of a thick black bar, a thinner white space or bar, and a thick black bar in a width ratio of 2:1:2.

Features of operation of the sixth embodiment will be described with reference to a flowchart of FIGS. 18–23. Programs for realizing the respective functions described in the flowchart are stored in the form of program codes readable by the CPU 2-10 in a storage medium. The CPU 2-10 performs its operation in accordance with the program codes.

FIG. 18 is a flowchart of specifying a scan position by scanning the three pairs of marks MK with the scanner unit 1. The system 2 outputs a power supply on/off signal and a high laser beam signal during the time when the power supply on/off signal is high. Thus, laser beam irradiation is performed invariably during that time, the scan mirror is driven, a scan timing signal is inverted each time the scan direction is changed alternately between right and left, and the clear signal generator 11-2 outputs a pulse signal ① based on a change of the scan timing signal to thereby clear the scan timing measuring counter 11-1, which starts to count in response to the laser beam irradiation on/off signal becoming high to thereby obtain a time from a change point of the scan timing signal to the its change point or a time required for the scan mirror to perform one complete scan. When optimal values are set in the right scan start and stop timing control registers 11-5R and 11-6R, and the left scan start and stop timing control registers 11-5L and 11-6L, using the three pairs of marks MK during such operation, the three pairs of marks MK are disposed in a line on a flat plane (for example, on an outer surface of the reader housing or a card) spaced a predetermined distance from the laser beam irradiation port of the scanner unit 1 in the central direction of laser beam irradiation, as shown in FIG. 17A. When an operator instructs the CPU 2-10 to perform the scan position specifying process, the CPU 2-10 initializes the right scan start and stop timing control registers 11-5R and 11-6R, and left scan start and stop timing control registers 11-5L and 11-6L (step A1), confirms a change of the scan direction based on a scan timing signal from the scanner unit 1, and determines whether the scan has changed from left to right (step A2), that is, determines whether the left scan has been completed and the right scan has started.

When the start of the right scan is determined, the CPU 2-10 gets via the DMA controller 2-7 changing information on a barcode image output from the image signal both-edge determiner 2-4 each time the barcode image signal from the scanner unit 1 changes, sets this signal as a present capture value, obtained this time, in the work memory (step A3), gets a preceding capture value set in the work memory, and compares the present and preceding capture values to thereby determine whether the present capture value is half the preceding one (step A4). Since in this case no preceding capture value is present initially, the CPU 2-10 determines NO at the step A4, and sets the capture value gotten this time as a preceding capture value in the work memory (step A5). In this case, as shown in FIG. 17A, in the start of the right scan, a first thick black bar of a mark which will be present on the left side of the maximum length barcode is read and its width value is stored as the preceding capture value in the work memory. The CPU 2-10 then returns its control to step A3 to get a next capture value. In this case, the CPU 2-10 reads the thinner white space or bar and compares the present and preceding bar width values. Since the present width value is about half the preceding one, the CPU 2-10 shifts its control to step A6 which updates the preceding capture value with the present capture value, and then gets a further next capture value (step A7). In this case, the CPU 2-10 reads a second thick black bar, and compares a corresponding present value and the preceding width value, and determines that the present value is about half the preceding one (step A8).

When in this way the CPU 2-10 reads the first mark having a width ratio of 2:1:2, it gets the time measured by the scan timing measuring counter 11-1 at that time (step A9) and sets the measured counter time as a maximum length or span right scan start data in the work memory (step A10). The mark MK has the contents of FIG. 17A. Thus, when the CPU 2-10 recognizes the first mark immediately after the right scan has started, the CPU 2-10 sets in the work memory a measuring counter time corresponding to the mark position as data indicative of the maximum span right scan start timing. Then, the CPU 2-10 shifts its control to step A1 to determine whether all 12 marks have been recognized and the corresponding data have been set. Now, since the process for the first mark has been finished, the CPU 2-10 returns its control to step A3 to perform the mark recognizing process. When the CPU 2-10 recognizes a second mark (steps A3–A8), it sets in the work memory the measured time in the scan timing measuring counter 11-1 as a medium length or span right-scan start data (steps A9, A10). Similarly, by recognizing a third mark, the CPU 2-10 sets the minimum length or span right-scan start data. By recognizing a fourth mark, the CPU 2-10 sets the minimum length or span right-scan stop data. Since the marks MK are scanned in the left direction from its seventh scan on, the values obtained about seventh to twelfth marks are the left scan data.

Figure 19:
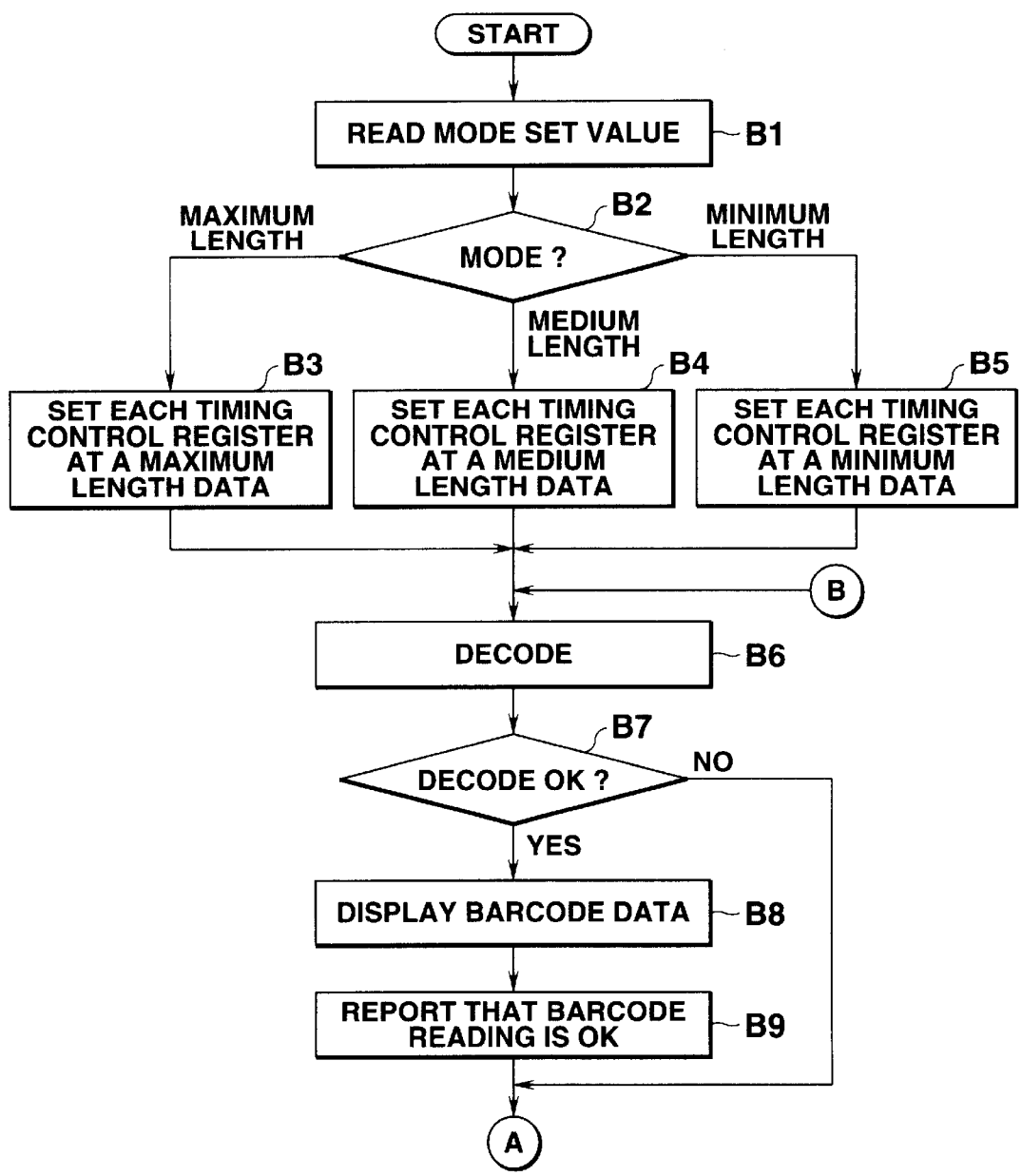
FIG. 19 is a flowchart of a barcode reading process.
Figure 20:
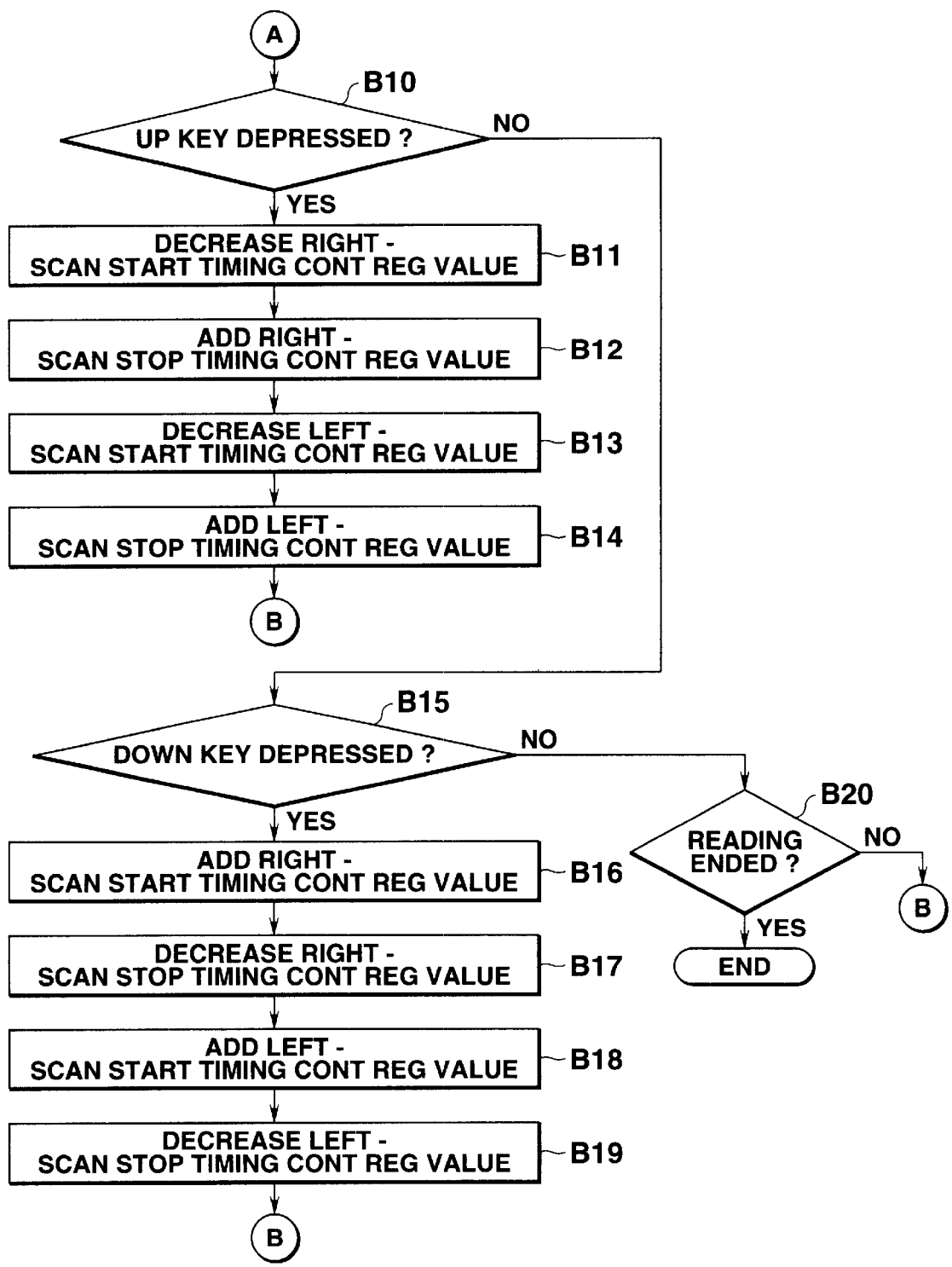
FIG. 20 is a flowchart continued from the flowchart of FIG. 19.

FIG. 19 is a flowchart of a general-barcode reading process. First, the CPU 2-10 reads a mode set value (B1), and determines a type of the mode (maximum, medium or minimum length or span mode) (step B2). Mode setting is selectable in accordance with a length of a barcode to be read. When the CPU 2-10 determines the selected mode, it performs a process corresponding to the mode (steps B3, B4, B5).

Figure 21:
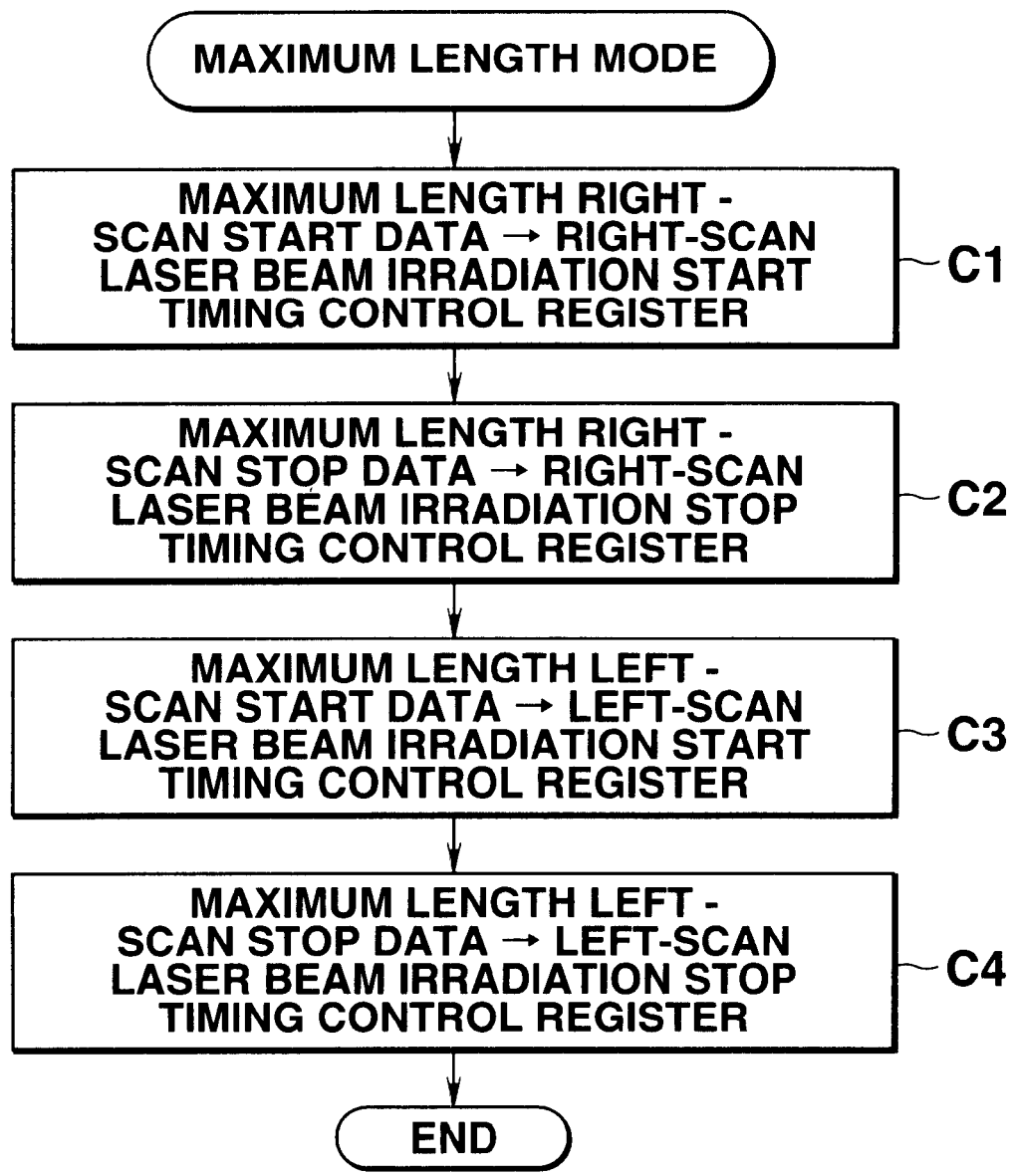
FIG. 21 is a flowchart of the details of step B3 (maximum length or span processing) of FIG. 19.
Figure 22:
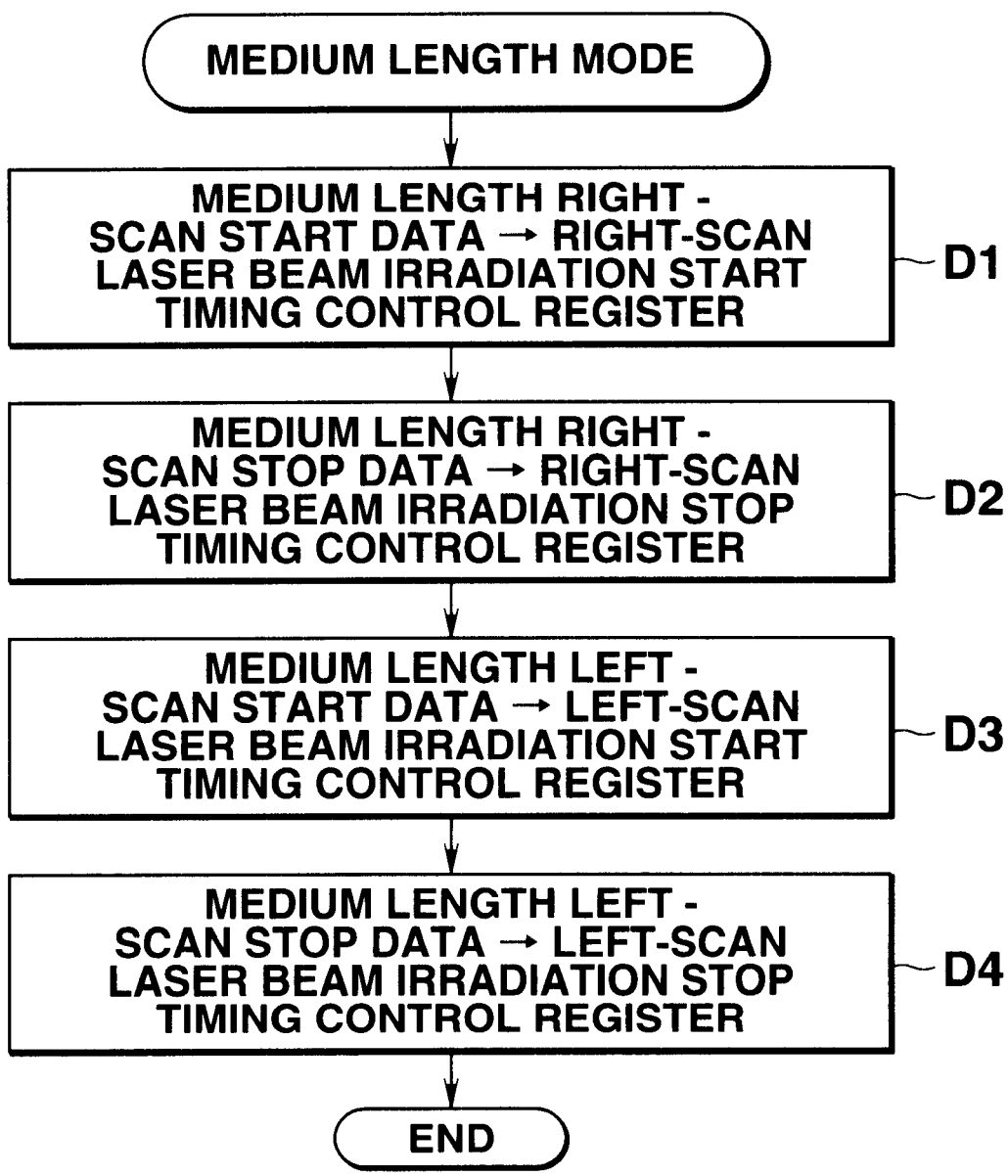
FIG. 22 is a flowchart of the details of step B4 (medium length or span processing) of FIG. 19.
Figure 23:
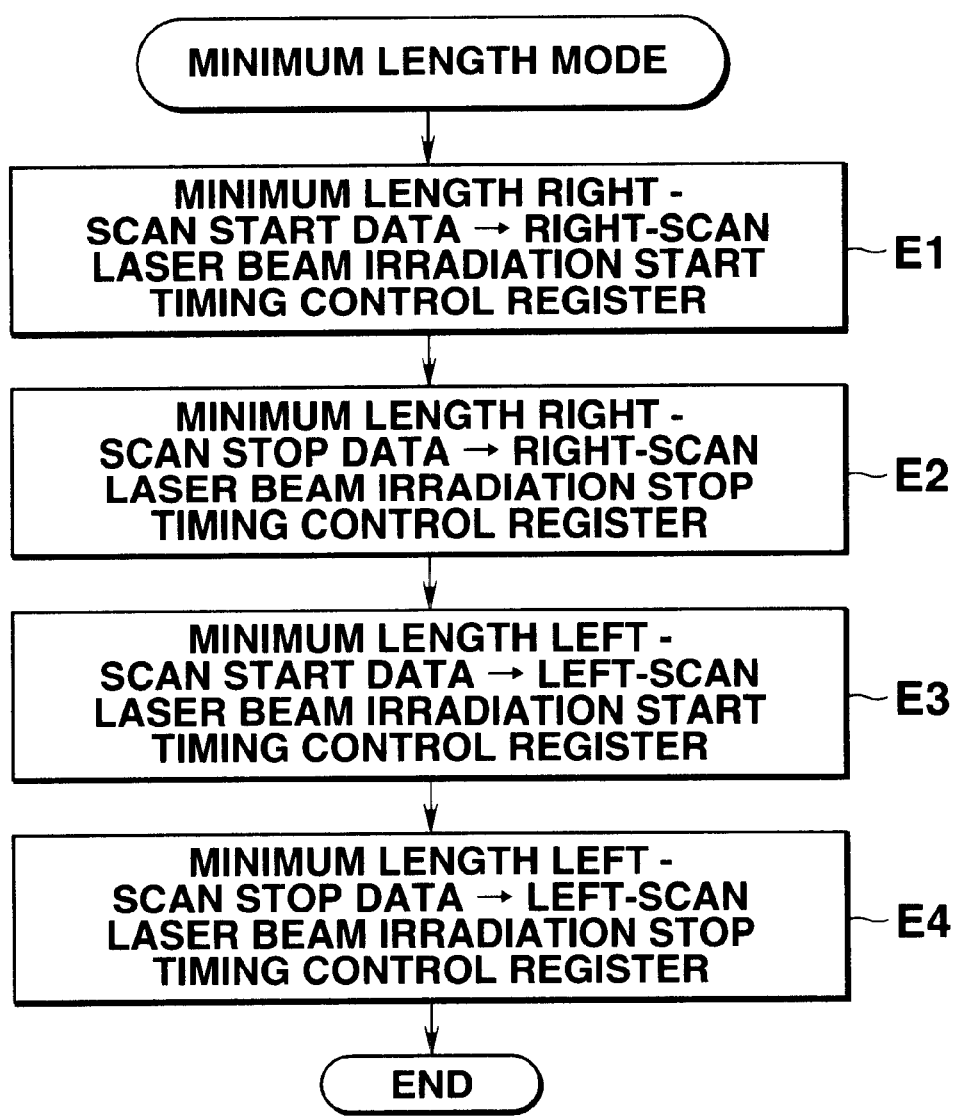
FIG. 23 is a flowchart of the details of step B5 (minimum length or span processing) of FIG. 19.

The CPU 2-10 performs a process corresponding to the maximum length or span mode (step B3) in accordance with a flowchart of FIG. 21. The CPU 2-10 reads the maximum length or span right-scan start data set in the work memory, and sets it in the corresponding start timing control register 11-5R (step C1). Similarly, the CPU 2-10 sets the maximum length or span right-scan stop data and the maximum length or span left-scan start data and the maximum length or span left-scan stop data in the corresponding stop timing control register 11-6R, start timing control register 11-5L, and stop timing control register 11-6L, respectively (step C2–C4). The CPU 2-10 performs a process corresponding to an medium length or span mode (step B4) in accordance with a flowchart of FIG. 22. That is, the CPU 2-10 reads the right and left scan start and stop data of the medium length or span, and sets those data in the corresponding start and stop timing control registers 11-5R, 11-6R, 11-5L and 11-6L, respectively (steps D1–D4). The CPU 2-10 then performs a process corresponding to the minimum length or span mode (step B5) in accordance with a flowchart of FIG. 23 in which the CUP 2-10 reads the right and left-scan start and stop data for the minimum length or span, and sets those data in the corresponding start and stop timing control registers 11-5R, 11-6R, and 11-5L, 11-6L, respectively (steps E1–E4).

Figure 24:
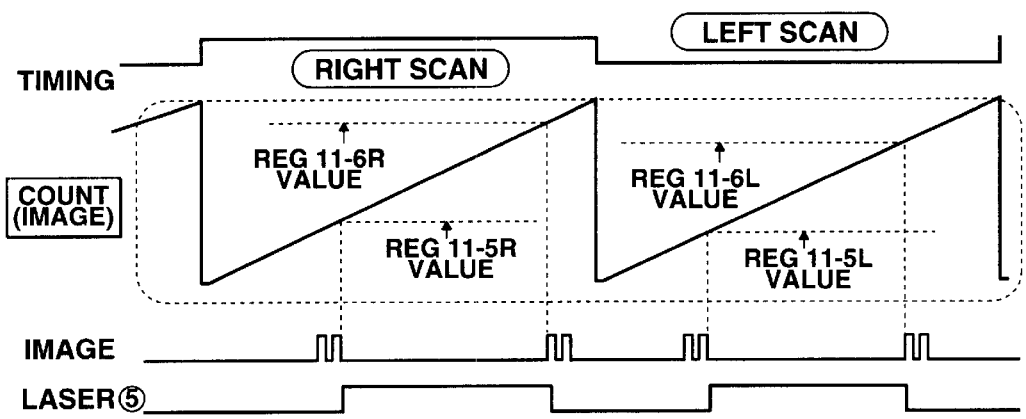
FIG. 24 is a timing chart of a pair of marks MK reading operation.

Then, the barcode reading starts. In this case, the laser beam irradiation range is controlled as shown in FIG. 24. More specifically, the clear signal generator 11-2 outputs a pulse signal ① based on a change of the scan timing signal, which clears the scan timing measuring counter 11-1. Thereafter, the counter 11-1 value A repeats an increase and a decrease in the form of a saw teeth following the motion of the scan mirror, as shown in FIG. 24. When the counter value A gradually increases and reaches the value set in the right-scan start timing control register 11-5R, the right-scan start determining comparator 11-3R outputs a start timing signal ②R, which becomes high when the counter value A has exceeded the register set value B. In response to a rise in the start timing signal ②R, the mask signal generator 11-7 outputs a high mask signal ④ which causes the AND gate 11-8 to output a high laser beam irradiation on/off signal ⑤ to thereby turn on the laser beam. Thereafter, the value in the scan timing measuring counter 11-1 increases and reaches the value set in the right-scan stop timing control register 11-6R, the stop determining comparator 11-4R detects the condition A<B. Thus, the stop timing signal ③R hence the mask signal ④ output from the mask signal generator 11-7, and the laser beam irradiation on/off signal ⑤ become low to thereby turn off the laser beam. This applies to the left scan similarly. Thus, the laser beam irradiation on/off signal ⑤ changes following the position of a read image of the pair of marks MK, as shown in FIG. 24, and the laser beam irradiation range becomes a one specified by the pair of marks.

Figure 25A:
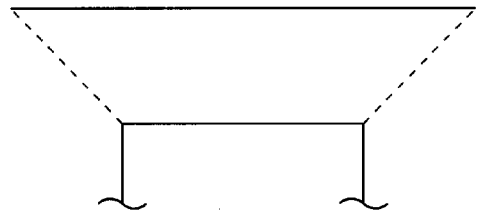
FIGS. 25A–C illustrate a manner in which the laser beam scan span is corrected by reading the pair of marks MK.
Figure 25B:
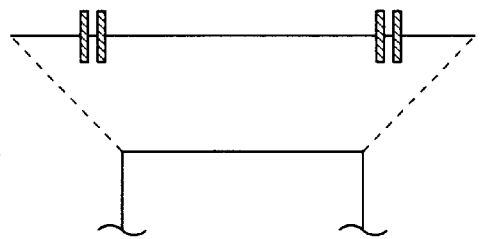
Figure 25C:
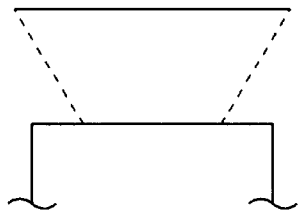
Figure 26A:
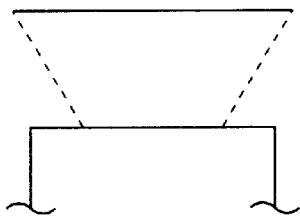
FIGS. 26A–C illustrate scan spans corrected in accordance with the maximum, medium and minimum modes, respectively.
Figure 26B:
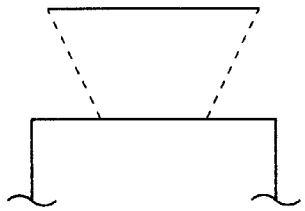
Figure 26C:
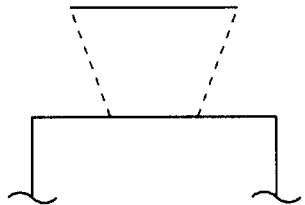

FIGS. 25A–C schematically illustrates correction to the laser beam scan span by reading a pair of marks MK. FIG. 25A shows a laser beam scan span before correction. In this state, when the pair of marks MK is read, as shown in FIG. 25B, the laser beam scan span corrected based on the pair of marks becomes as shown in FIG. 25C where the corrected scan span is greatly reduced compared to the uncorrected scan span. Thereafter, the barcode is scanned in this reduced range. FIGS. 26A, B and C show laser beam scan spans corrected in accordance with a maximum, an medium and a minimum length or span mode, respectively. By reading a pair of marks MK printed corresponding to one of the maximum, medium, and minimum lengths of barcodes, the laser beam scan span is corrected to a one depending on the mode concerned.

Then, the scanner unit 1 outputs a scan timing signal which is inverted each time one scan is completed, and delivered to the timing signal both-edge determiner 2-3. The barcode image signal output from the scanner unit 1 for each scan is delivered to the image signal both-edge determiner 2-4. At this time, the timing signal both-edge determiner 2-3 detects a rise/fall in the scan timing signal, delivers information on one-scan completion as an interrupt request to the interrupt controller 2-5. The image signal both-edge determiner 2-4 detects each change in the barcode image signal, delivers this information to the DMA controller 2-7, which gets the value in the counter 2-6, and transfers it to the work memory 2-8.

In response to this operation, the CPU 2-10 decodes the barcode information transferred to the work memory 2-8 in accordance with the program in the program memory 2-9 (step B6 of FIG. 19), and then determines whether the barcode information is decoded normally (step B7). If so, the CPU 2-10 outputs a result of the decoding (step B8), and reports that the barcode has been read satisfactorily (step B9). The CPU 2-10 then shifts its control to a process shown by a flowchart of FIG. 20 which includes manually adjusting finely a laser beam irradiation span (scan span) set by reading the pair of marks MK To this end, up and down keys are provided for adjusting purposes. When the up key is depressed (step B10), the set value in the start timing control register 11-5R is reduced by a predetermined quantity (step B11). By this processing, the scan start position is shifted by the predetermined quantity leftward from the left end of the area of the set scan span, and the set scan span is enlarged accordingly. Then, a process for increasing the set value in the stop timing control register 11-6R by the predetermining quantity is performed (step B12). By this processing, the scan stop position is shifted by the predetermined quantity rightward from the right end of the area of the set scan span, and the set scan span is increased accordingly. This applies similarly in the left scan, and hence the set value in the start timing control register 11-5L is decreased by the predetermined quantity (step B13) and the set value in the stop timing control register 11-6L is increased by the predetermined quantity (step B14).

When the down key is depressed (step B15), the predetermined quantity is added to each of the start timing control registers 11-5R and 11-5L and the predetermined quantity is decreased from the set value in each of the stop timing control registers 11-6R and 11-6L, contrary to the case when the UP key was depressed (steps B16–B19). FIGS. 27A–E illustrate how the set scan spans are finely adjusted by depression of the up and down keys. FIG. 27A shows a set scan span before the fine adjustment; FIG. 27B an increase in the scan span occurring when the up key is depressed; and FIGS. 27C–E gradual decreases in the scan span occurring when the down key is successively depressed. Unless any of the up and down keys is depressed, the CPU 2-10 shifts its control to step B20 which determines whether the CPU 2-10 has detected termination of the reading. If not, the CPU 2-10 returns its control to step B6 to repeat the above operations concerned.

As described above, in the sixth embodiment, the scanner unit 1 reads each pair of marks MK which specifies the start and stop positions of the laser beam irradiation. The CPU 2-10 then detects the start and stop positions of the laser beam irradiation determined by the pair of marks MK, sets them as information on the scan span control. In the barcode reading, the CUP 2-10 controls the turning on/off of the laser beam in one scan period based on the start and stop positions set as the scan span control information. Thus, even when there are worst deviations in the scan velocity, scan velocity characteristic, scan angle, and scan mirror attaching angle from their standards, ideal scan span control is provided so as to cope with changes in the scanner operation due to its environment of use and aging. In this case, the scanner unit 1 reads the pair of marks MK, no load circuits and special functions are required to be provided additionally. Possible deviations of a scanner unit such as mentioned above as a product as they are can be measured, and correction data for achieving optimal scan span control are obtained. It is only required to set values depending on the results of reading the pair of marks MK in the start timing control registers 11-5R and 11-5L and in the stop timing control registers 11-6R and 11-6L, which is easily performed. When the vibration type scan mirror performs right and left scans, high accuracy barcode reading is achieved in which the right scan span completely coincides with the left scan span.

Further, three pairs of marks MK corresponding to the maximum, medium and minimum spans depending on the barcode lengths are formed. Thus, only scanning the three pairs of marks MK right and left once with the scanner unit 1 leads to reading the start and stop positions of the maximum, medium and minimum spans in the right and left scans. By selecting any one from among those spans, the start and stop positions of the selected span can be set as scan span control information. The scan span set by reading each of the marks MK can be finely adjusted each time the up or down key is depressed.

Seventh Embodiment

Figure 28:
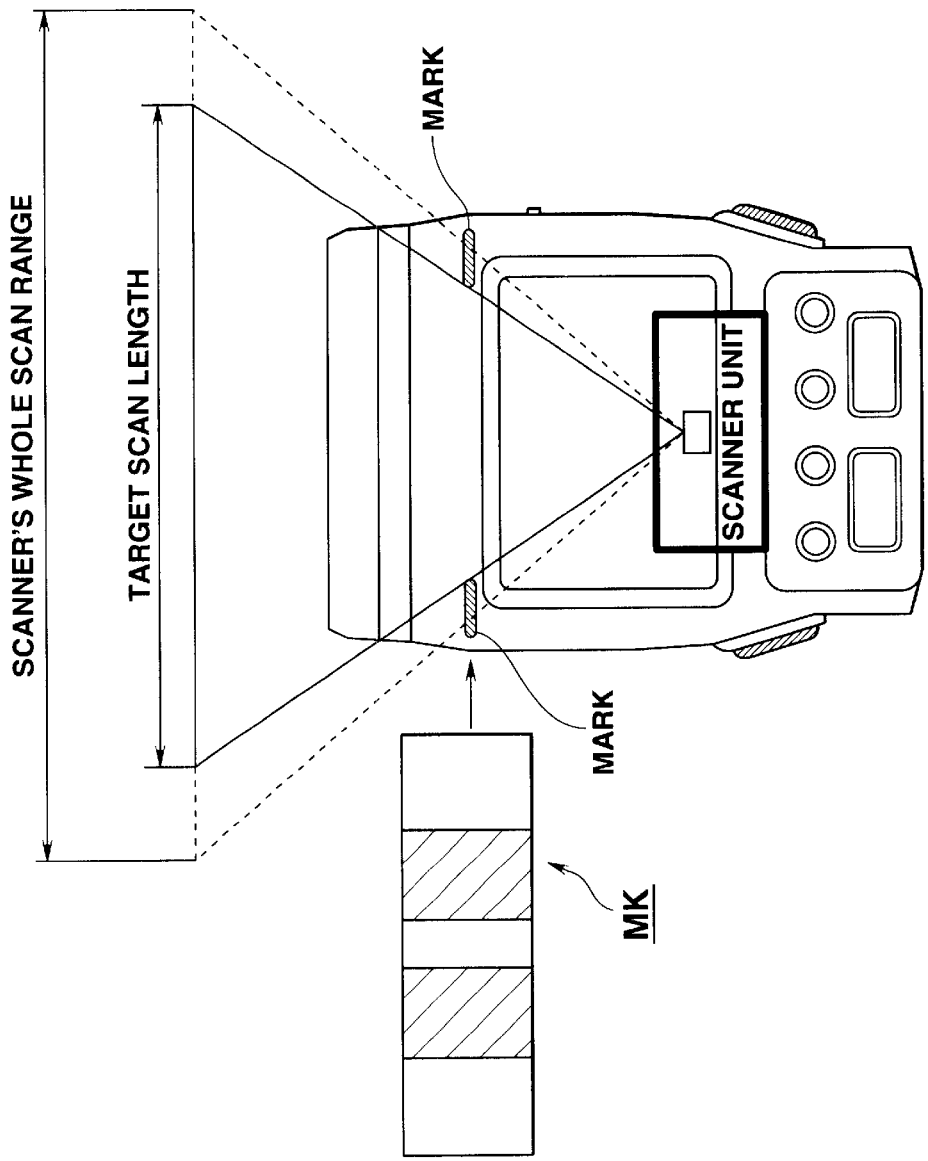
FIG. 28 illustrates a seventh embodiment.

FIG. 28 illustrates a seventh embodiment. As described above, in the sixth embodiment of the three pairs of marks MK are illustrated as formed on an outer surface of the barcode reader or a portable card. In this seventh embodiment, each of a pair of marks having the same composition as the pairs of marks mentioned above is disposed on a respective one of opposite sides of the laser beam irradiation port on an inner surface of the reader housing such that its effective irradiation range is not shielded by the pair of marks, as shown in FIG. 28. Since the pair of marks MK are provided within the barcode reader housing as just described above, the contents of the pair of marks MK can be read excluding a scan in the set scan span, that is, in the scan within the whole scan range of the scanner unit. Thus, automatic scan span control is achieved and the user is not required to take the trouble to prepare for such a pair of marks and set them.

While in the sixth and seventh embodiments one or more pairs of marks MK are used to correct the scan span, the scan span may be corrected by reading the actual barcode and measuring the barcode length. In this case, data is required to be input to select one of general reading and reading for scan span correction.

What is claimed is:

1. A laser beam scanning bar code reader comprising:
barcode reading means for driving a scan mirror to irradiate a laser beam on a selected one of a barcode and a pair of spaced marks, for receiving a reflected beam from the selected one of the barcode and the pair of marks, and for reading the selected one of the barcode and pair of marks;
detecting means, responsive to said barcode reading means reading the pair of marks, for detecting the start and stop positions of the laser beam irradiation determined by the pair of marks;
setting means for setting therein as scan span control information the start and stop positions detected by said detecting means; and
laser beam irradiation driving means for controlling the turning on/off of the laser beam in one scan period based on the start and stop positions set as the scan span control information in reading the barcode to thereby control the actual scan span in which the laser beam is on in the one scan period based on the start and stop positions of the laser beam irradiation determined by the pair of marks.

2. The laser beam scanning barcode reader of claim 1, further comprising:
scan timing measuring means for measuring a present scan timing following the driving of the scan mirror in the one scan period;
determining means for comparing a value measured by said scan timing measuring means with each of preset start and stop timing values to determine the start and stop timings of laser beam irradiation in the one scan period, and wherein:
said setting means sets therein values of the start and stop positions detected by said detecting means as the start and stop timing values to be compared with the value measured by said scan timing measuring means; and said laser beam irradiation driving means controls the turning on/off of the laser beam in the one scan period based on the start and stop timings of the laser beam irradiation determined by said determining means.

3. The laser beam scanning barcode reader of claim 1, wherein:

said detecting means detects the start and stop positions of the laser beam irradiation determined by the pair of marks each time the scan direction is reversed between right and left by the scan mirror.

4. The laser beam scanning barcode reader of claim 1, further comprising:

a plurality of pairs of differently spaced marks, in which each pair of marks determines start and stop positions of the laser beam irradiation corresponding to a length of the barcode, and wherein said detecting means detects the start and stop positions of the laser beam irradiation determined by the pair of marks.

5. The laser beam scanning barcode reader of claim 4, further comprising:

selecting means for selecting the start and stop positions of the laser beam irradiation corresponding to the length of a target barcode to be read from among the start and stop positions of the laser beam irradiation detected by said detecting means and corresponding to the lengths of barcodes, and wherein said setting means sets therein as scan span control information the start and stop positions selected by said selecting means.

6. The laser beam scanning barcode reader of claim 1, further comprising:

adjusting means for adjusting in accordance with an instruction of adjustment the start and stop positions set in said setting means to change the actual scan span in which the laser beam is turned on in one scan period.

7. The laser beam scanning barcode reader of claim 6, wherein:

said adjusting means changes the actual scan span in units of a predetermined quantity in accordance with the instruction of adjustment.

8. The laser beam scanning barcode reader of claim 1, wherein:

the pair of marks are each disposed on a respective one of opposite sides, and in the vicinity, of a laser beam irradiation port in the reader on an inner surface of a housing of the reader.

9. A recording medium which contains computer-readable program codes to cause a computer to fulfil the functions of:

driving a scan mirror to irradiate a laser beam on a selected one of a barcode and a pair of spaced marks;

receiving a reflected beam from the selected one of the barcode and the pair of marks;

reading the selected one of the barcode and pair of marks;

detecting the start and stop positions of the laser beam irradiation determined by the pair of marks in response to reading the pair of marks;

setting as scan span control information the detected start and stop positions; and controlling the turning on/off of the laser beam in one scan period based on the start and stop positions set as the scan span control information in reading the barcode to thereby control the actual scan span in which the laser beam is on in the one scan period based on the start and stop positions of the laser beam irradiation determined by the pair of marks.

* * * * *